(12) United States Patent
Tibbits et al.

(10) Patent No.: US 11,667,072 B2
(45) Date of Patent: Jun. 6, 2023

(54) LIQUID METAL PRINTING

(71) Applicants: Massachusetts Institute of Technology, Cambridge, MA (US); AISIN AW CO., LTD., Anjo (JP)

(72) Inventors: Skylar J. E. Tibbits, Boston, MA (US); Jared Smith Laucks, Somerville, MA (US); Schendy G. Kernizan, Milton, MA (US); Bjorn Eric Sparrman, Somerville, MA (US); Nobuhiro Miya, San Jose, CA (US); Masaki Otomori, San Jose, CA (US)

(73) Assignees: MASSACHUSETTS INSTITUTE OF TECHNOLOGY, Cambridge, MA (US); AISIN AW CO., LTD., Anjo (JP)

( * ) Notice: Subject to any disclaimer, the term of this patent is extended or adjusted under 35 U.S.C. 154(b) by 266 days.

(21) Appl. No.: 17/073,158

(22) Filed: Oct. 16, 2020

(65) Prior Publication Data
US 2021/0114285 A1 Apr. 22, 2021

Related U.S. Application Data

(60) Provisional application No. 62/916,118, filed on Oct. 16, 2019.

(51) Int. Cl.
| | | |
|---|---|---|
| *B33Y 30/00* | (2015.01) |
| *B22D 23/02* | (2006.01) |
| *B22D 45/00* | (2006.01) |
| *B29C 64/118* | (2017.01) |
| *B29C 64/209* | (2017.01) |
| *B29C 64/227* | (2017.01) |
| *B29C 64/371* | (2017.01) |
| *B29C 64/321* | (2017.01) |

(Continued)

(52) U.S. Cl.
CPC ............ *B29C 64/118* (2017.08); *B22D 23/02* (2013.01); *B22D 45/00* (2013.01); *B29C 64/209* (2017.08); *B29C 64/227* (2017.08); *B29C 64/295* (2017.08); *B29C 64/321* (2017.08); *B29C 64/371* (2017.08); *B33Y 10/00* (2014.12); *B33Y 30/00* (2014.12)

(58) Field of Classification Search
None
See application file for complete search history.

(56) References Cited

U.S. PATENT DOCUMENTS

| | | |
|---|---|---|
| 10,513,089 B2 | 12/2019 | Tibbits et al. |
| 10,549,505 B2 | 2/2020 | Tibbits et al. |
| 10,633,772 B2 | 4/2020 | Tibbits et al. |

(Continued)

FOREIGN PATENT DOCUMENTS

| | | |
|---|---|---|
| WO | WO 2001/078968 A1 | 10/2001 |
| WO | WO 2018/187514 A1 | 10/2018 |

OTHER PUBLICATIONS

Third Party Submission under 37 CFR 1.290, filed by Joshua Pearce in U.S. Appl. No. 15/945,704 (2019).

(Continued)

*Primary Examiner* — Scott R Kastler
(74) *Attorney, Agent, or Firm* — Hamilton, Brook, Smith & Reynolds, P.C.

(57) ABSTRACT

Liquid metals or plastic are deposited into a reservoir of powder that supports the liquid metal or plastic as it cools.

14 Claims, 45 Drawing Sheets

(51) Int. Cl.
B33Y 10/00 (2015.01)
B29C 64/295 (2017.01)

(56) References Cited

U.S. PATENT DOCUMENTS

| | | |
|---|---|---|
| 2003/0090034 A1 | 5/2003 | Mülhaupt et al. |
| 2015/0158244 A1 | 6/2015 | Tibbits et al. |
| 2016/0009029 A1 | 1/2016 | Cohen et al. |
| 2016/0067918 A1 | 3/2016 | Millar |
| 2016/0101594 A1 | 4/2016 | Tibbits et al. |
| 2017/0087632 A1* | 3/2017 | Mark .................. B22D 11/01 |
| 2017/0120535 A1 | 5/2017 | MacCurdy et al. |
| 2017/0326785 A1 | 11/2017 | MacCurdy et al. |
| 2018/0021140 A1 | 1/2018 | Angelini et al. |
| 2018/0194106 A1 | 7/2018 | Tibbits et al. |
| 2018/0195213 A1 | 7/2018 | Tibbits et al. |
| 2018/0281295 A1 | 10/2018 | Tibbits et al. |
| 2018/0345573 A1* | 12/2018 | Zinniel .................. B21C 33/02 |
| 2019/0039309 A1 | 2/2019 | Busbee et al. |
| 2020/0016833 A1 | 1/2020 | Yuwaki et al. |
| 2020/0316847 A1 | 10/2020 | Tibbits et al. |
| 2021/0114285 A1* | 4/2021 | Tibbits .................. B29C 64/371 |

OTHER PUBLICATIONS

Pearce, A novel approach to obviousness: An algorithm for identifying prior art concerning 3-D printing materials, World Patent Information 42, 13-18 (2015).

Appropedia, "Obvious 3D printer technology based on 39. Inert environment," 2015-2016, (2019).

Clark, Liat, "How hair gel enables freeform 3D printing with an undo function," Retrieved from the Internet at: https://www.wired.co.uk/article/undo-3d-printing, Retrieved from the Internet on: Mar. 22, 2019, 11 pages.

* cited by examiner

FIG. 15A
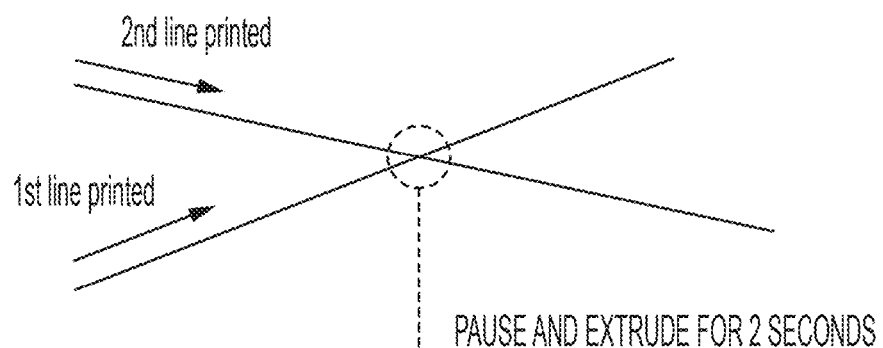
FIG. 15B
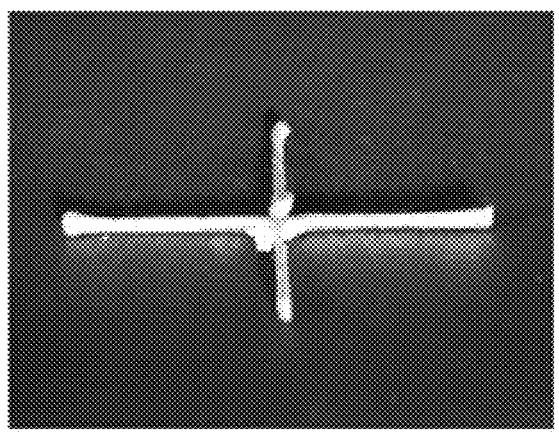 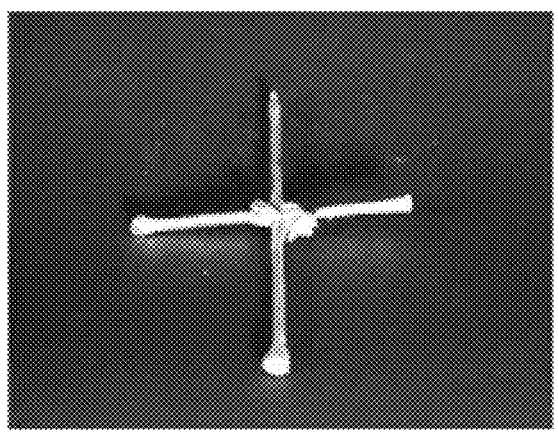
FIG. 15 C  FIG. 15D

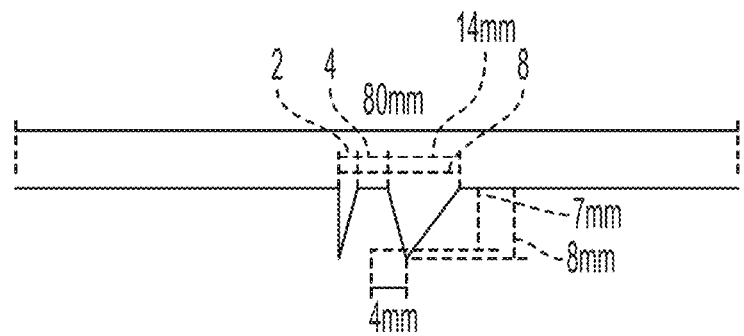
FIG. 18A
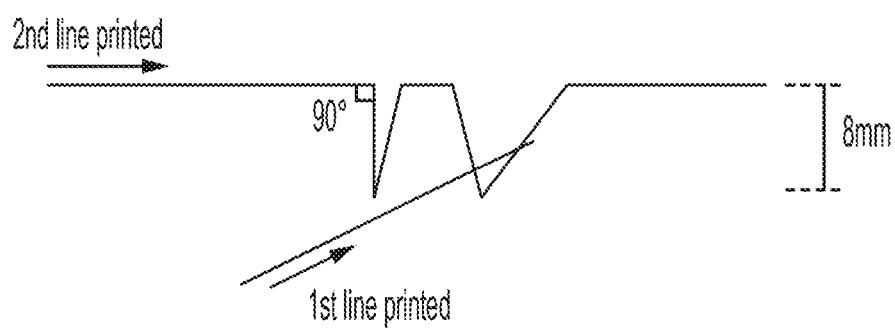
FIG. 18B
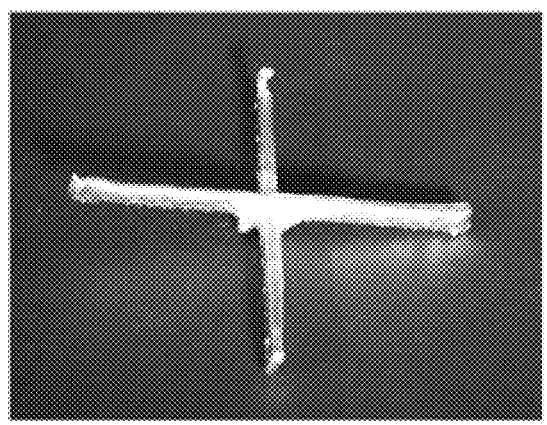 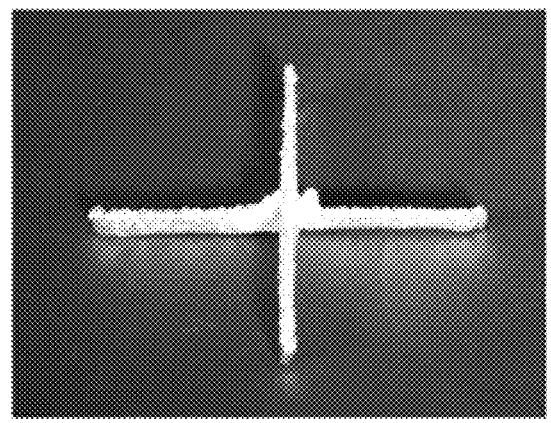
FIG. 18C  FIG. 18D

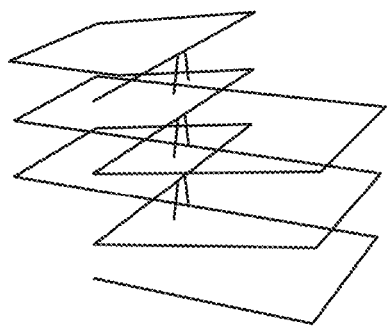 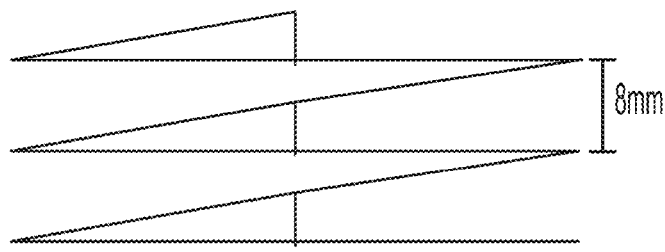
FIG. 24A　　　　　　　　FIG. 24B
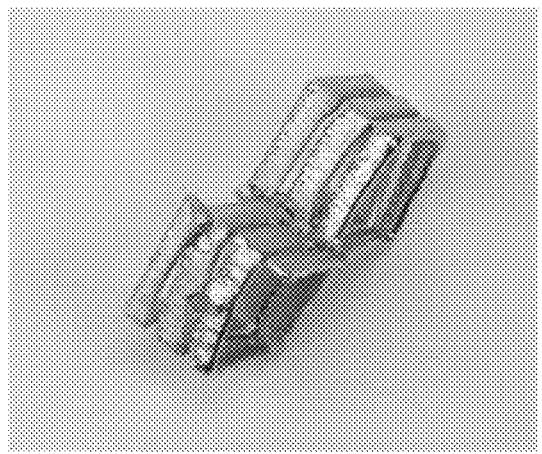 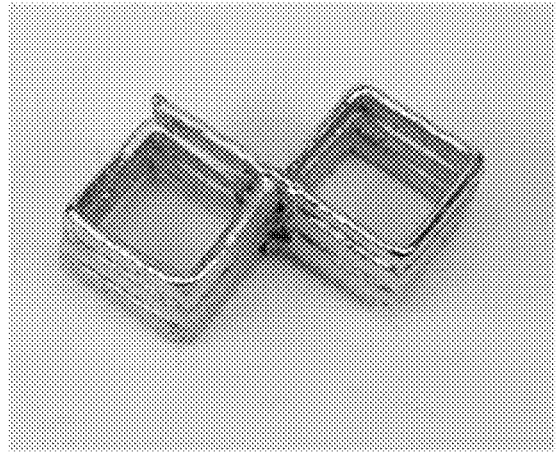
FIG. 24C　　　　　　　　FIG. 24D

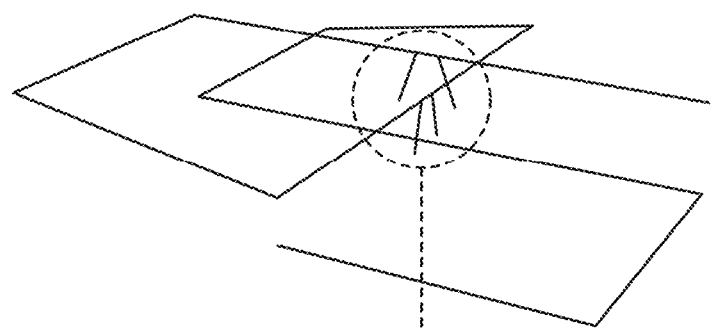
FIG. 26A
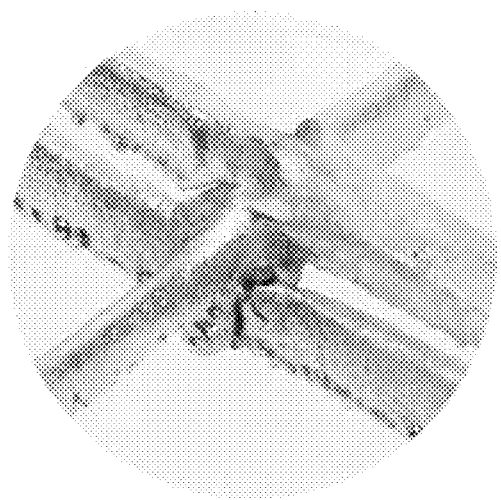
FIG. 26B
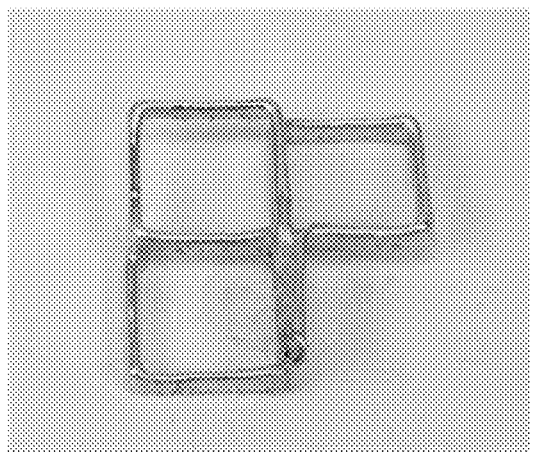
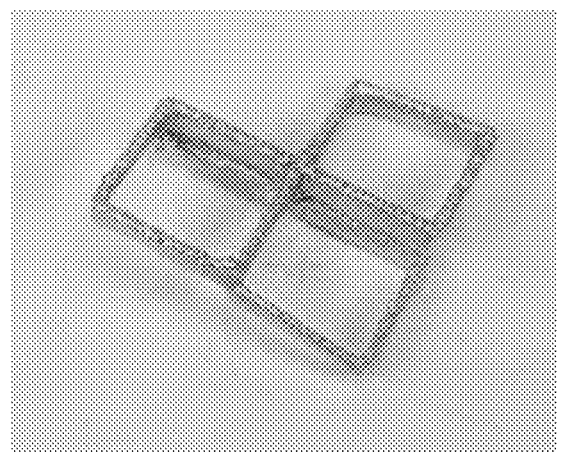
FIG. 26C   FIG. 26D

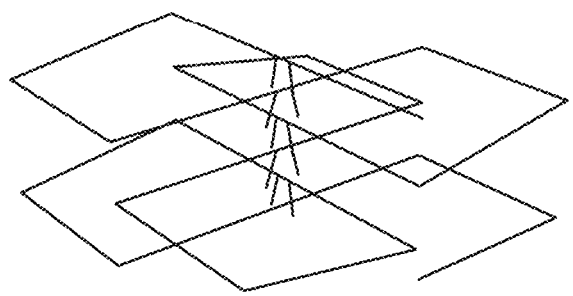
FIG. 27A
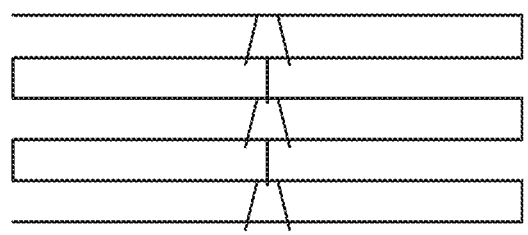
FIG. 27B
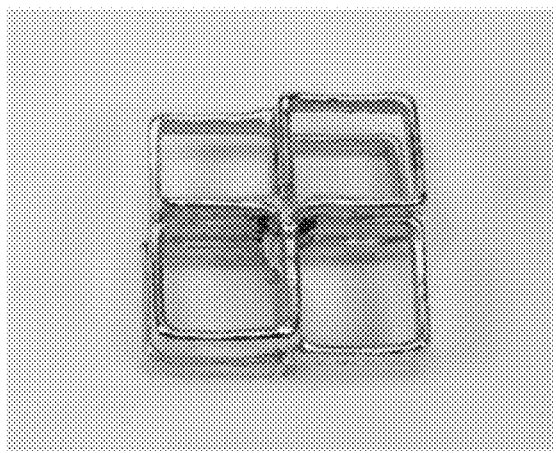 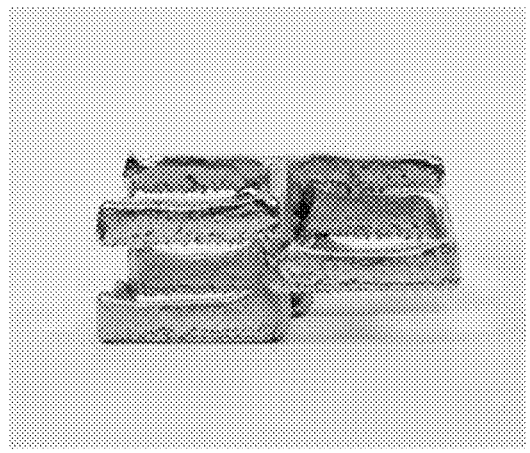
FIG. 27C            FIG. 27D

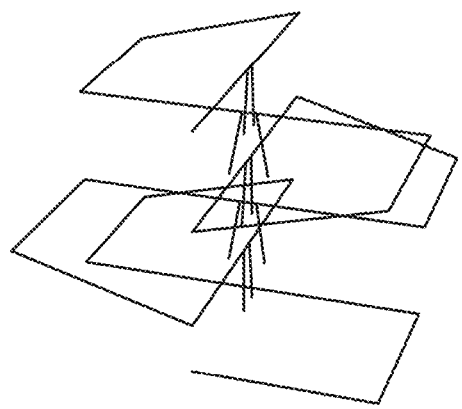
FIG. 28A
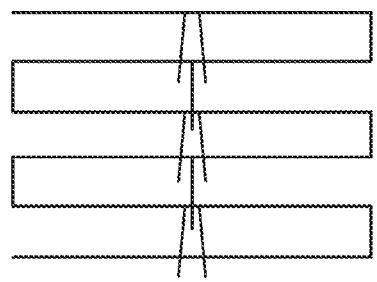
FIG. 28B
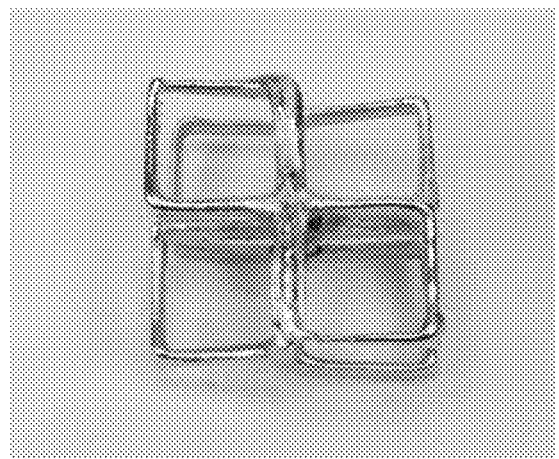    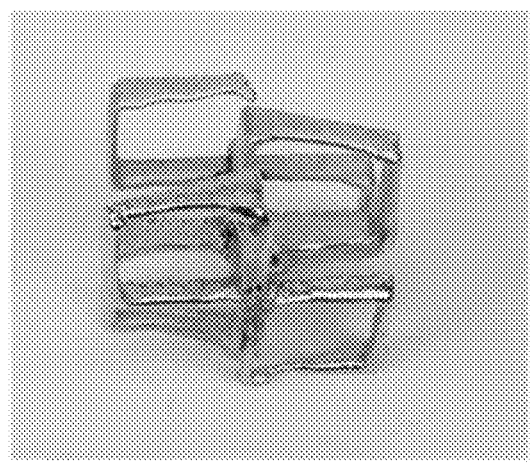
FIG. 28C            FIG. 28D

US 11,667,072 B2

LIQUID METAL PRINTING

RELATED APPLICATION

This application claims the benefit of U.S. Provisional Application No. 62/916,118, filed on Oct. 16, 2019. The entire teachings of the above application(s) are incorporated herein by reference.

BACKGROUND

Three-dimensional printing of metals has typically been constrained by very small print volumes and slow print speeds. Similarly, traditional metal printing has been limited to layer-by-layer sintering processes, fused filament fabrication (also known as fused deposition modeling (FDM)), and powder metal printing, which print at a slow rate.

Three-dimensional printing of thermoplastics has often been constrained by the layer-by-layer printing processes in FDM that create low-resolution surfaces, require excessive support materials, and have slow print speeds.

Processes that allow for more rapid three-dimensional printing of metals and high temperature thermoplastics are desirable.

SUMMARY

Described herein are methods and devices for three-dimensional printing of high temperature materials, such as metals and thermoplastics. The methods pertain to three-dimensional printing within a powder-based suspension that supports an extruded liquid material. The powder suspension supports the extruded liquid material as it is deposited, thereby eliminating the need for a support material. Post processing is simplified since there is no need to eliminate a support material. The liquid material can be printed more quickly than traditional processes for three-dimensional printing of metals. Large products can be printed, limited only by the volume of powder-based support. A wide variety of metals can be printed.

Described herein is a method of printing within a powder suspension environment, whereby a high-temperature liquid material is deposited in three-dimensional space. Typically, a gantry-type system or industrial robot arm is used, but the process can also be performed manually. The methods allow for extremely fast printing with a variety of metal and thermoplastic materials. After the liquid material is printed, it cools and hardens. The method is only limited by the size of the powder container or printing apparatus.

Custom nozzles can be used to control the flow rate, size, direction and cross-sectional geometry. Similarly, complex three-dimensional tool paths can be created to print in any orientation and direction in 3D space. Typical high-temperature printing processes include FDM and SLS, both of which are typically slow and constrained to small print volumes. Both of these processes also require local curing of the material as it is extruded, before the machine can continue printing. SLS requires sintering powders, while FDM requires melted plastics to cool upon a previously printed layer or support material, before continuing to print. Our process extrudes a high-temperature liquid metal or plastic within a powder bath, printing in three dimensions, rather than layer-by-layer, and does not need to cure the material locally before continuing to print. The hot extruded liquid material is deposited and fully supported by the powder suspension, allowing it to cool as the machine continues to print. The powder supports the extruded material, eliminating support materials and allowing for fully three-dimensional printing.

The post-printing-process time is also dramatically decreased with the elimination of printed supports which traditionally need to be manually removed or dissolved. With traditional selective laser sintering (SLS) metal printing, support materials have been a major challenge since it requires a secondary material that can either be physically broken off or otherwise melted or chemically removed. In FDM printing, support materials are far more common, however it increases the amount of printed material significantly and greatly reduces the print speed. By utilizing a powder suspension we can completely eliminate support materials and post processing steps because the powder suspends the printed material in three-dimensional space.

Described herein is a method of forming a metal object. The method can include depositing a liquid metal through a nozzle and into a reservoir of powder while moving the nozzle; and allowing the metal to solidify. The nozzle can be moved in three dimensions. A gantry or robotic arm can move the nozzle. The powder can be a powdered salt. The liquid metal can be deposited at least 55 mm below a surface of the powder. The method can include forming a joint by moving the nozzle through previously-deposited liquid metal. The method can include forming a joint by depositing liquid metal adjacent to previously deposited, but solidified metal.

Described herein is an apparatus for extruding liquid metal. The apparatus can include a crucible having a well for holding liquid metal; a first heating element that at least partially surrounds the crucible; an exterior chamber, having positioned therein a second heating element that at least partially surrounds an interior chamber that connects to a nozzle; and a rod disposed between the nozzle and a solenoid resting above the crucible. The apparatus can include a probe positioned within the crucible and supported above the crucible, whereby the probe is configured to generate a signal indicative of the presence of an electrical current. The apparatus include an inlet for an inert gas. The apparatus can include a clamp that connects the interior chamber to a bracket. The nozzle and interior chamber can have mating threaded portions. The apparatus can include a motor that controls inlet of feedstock wire into the crucible.

Described herein is an apparatus for continuous extrusion of liquid metal. The apparatus can include an exterior chamber for feeding a metal wire therethrough; an elongated sleeve posited within the exterior chamber; a hollow cylinder that is at least partially surrounded by a heating element, whereby the hollow cylinder and heating element are posited within the elongated sleeve; and a nozzle connected to an end of the exterior chamber. The apparatus can include a clamp that connects the exterior chamber to a bracket. The nozzle and exterior chamber can have mating threaded portions.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 1A shows a nozzle before being placed into a powder for deposition of liquid metal. A small amount of liquid metal is visible at the tip of the nozzle. FIG. 1B shows the nozzle after being placed into a reservoir of powder.

FIG. 1C shows the nozzle after moving through the reservoir of powder.

FIG. 3A shows a nozzle that has been moved through a powder reservoir and subsequently removed from the powder reservoir. Some liquid dripping from the end of the nozzle is visible. FIG. 3B shows removal from the powder reservoir of the metal object formed in FIG. 3A. FIG. 3C shows the object after removal from the powder reservoir.

FIG. 8A shows a straight nozzle above a container of iron powder. FIGS. 8B and 8C show opposite sides of an object formed by printing metal powder. The surface texture of the bottom and top sides, as printed, differs.

FIGS. 10A-B correspond to metal lines formed with a straight nozzle, as in FIG. 13A.

FIG. 13A is a straight nozzle. FIG. 13B is a nozzle having an opening with a triangular cross-section. FIG. 13C is a nozzle having an opening with a T-shaped cross-section. FIG. 13D is a nozzle having an opening with an X-shaped cross-section.

FIGS. 15A-D illustrate joining on the same plane. FIGS. 15A and 15B are schematics for a print process. FIGS. 15C and 15D are photographs of an object printed according to FIGS. 15A and 15B.

FIGS. 16A and 16B are schematics for a print process. FIGS. 16C and 16D are photographs of an object printed according to FIGS. 16A and 16B.

FIGS. 17A and 17B are schematics for a print process. FIG. 17C and FIG. 17D are photographs of an object printed according to FIGS. 17A and 17B.

FIGS. 18A-D illustrate joining on the same plane. FIGS. 18A and 18B are schematics for a print process. FIG. 18C and FIG. 18D are photographs of an object printed according to FIGS. 18A and 18B.

FIG. 19A is a schematic of a print process. FIG. 19B and FIG. 19C are photographs of an object printed according to FIG. 19A.

FIG. 20A is a schematic of a print process. FIG. 20B is a photograph of an object printed according to FIG. 20A.

FIG. 21A is a schematic of a print process. FIG. 21B and FIG. 21C are photographs of an object printed according to FIG. 21A.

FIG. 22A is a schematic of a print process.

FIG. 22B is a photograph of an object printed according to FIG. 22A. FIG. 22C is a schematic of the joints.

FIGS. 24A-D illustrate joining at multiple levels—joints in the same direction every second layer. FIG. 24A is a perspective view of a schematic for a grid design. FIG. 24B is a side view for a schematic of a grid design. FIGS. 24C and 24D are photographs of joining at multiple levels created according to FIGS. 24A and 24B.

FIG. 25A is a perspective view of a schematic for a grid design. FIG. 25B is a side view for a schematic of a grid design. FIGS. 25C and 25D are photographs of joining at multiple levels created according to FIGS. 25A and 25B.

FIGS. 26A-D illustrate a double joint in different direction at every level. FIG. 26A is a perspective view of a schematic for a grid design. FIG. 26B is a close-up view of one joint of FIG. 26A. FIGS. 26C and 26D are photographs of joints created according to FIG. 26A.

FIGS. 27A-D illustrate a double joint in different direction every level. FIG. 27A is a perspective view of a schematic for a grid design. FIG. 27B is a side view for a schematic of a grid design. FIGS. 27C and 27D are photographs of joints created according to FIGS. 27A and 27B.

FIGS. 28A-D illustrate a double joint in different direction every level (longer joints). FIG. 28A is a perspective view of a schematic for a grid design. FIG. 28B is a side view for a schematic of a grid design. FIGS. 28C and 28D are photographs of joints created according to FIGS. 28A and 28B.

FIG. 29A is a perspective view of a schematic for a grid design. FIG. 29B is a side view for a schematic of a grid design. FIG. 29C is a plan view for a schematic of a grid design. FIGS. 29D and 29E are photographs of joints created according to FIGS. 29A-C.

FIG. 30A is a perspective view of a schematic for a grid design. FIG. 30B is a side view for a schematic of a grid design. FIG. 30C is a photograph of joints created according to FIGS. 30A and 30B.

FIG. 31A is a cross-sectional view. FIG. 31B is a perspective view. FIG. 31C is an exploded view.

FIG. 32A is a cross-sectional view. FIG. 32B is an exploded view.

DETAILED DESCRIPTION

Figure 1A:
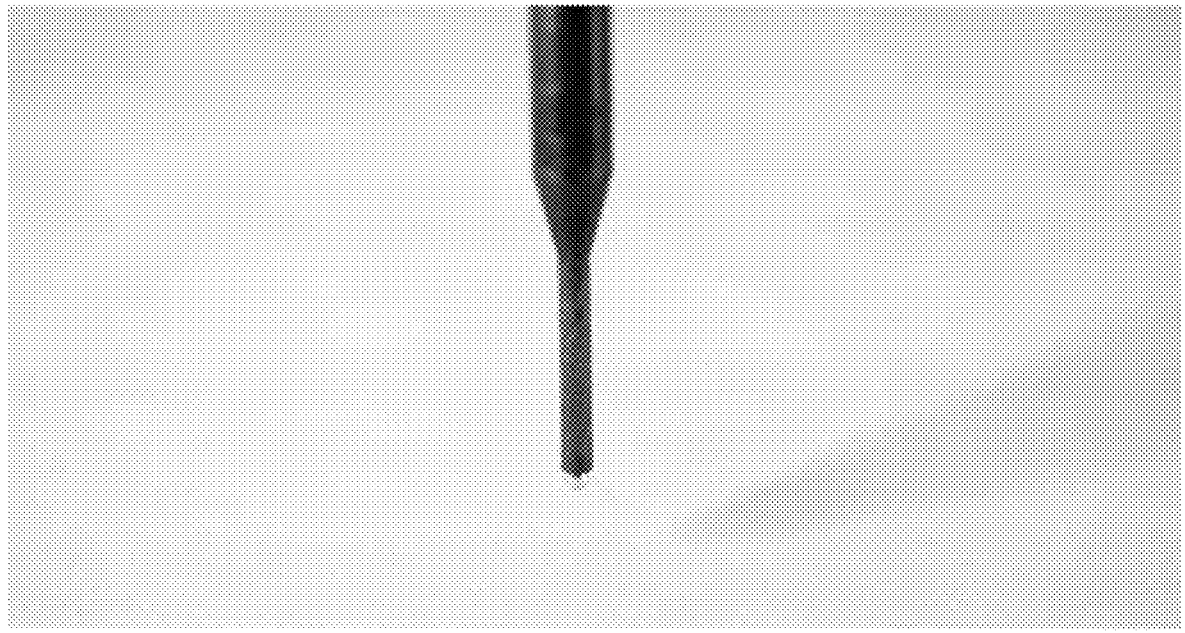
FIGS. 1A-C are images of liquid metal printing.
Figure 1B:
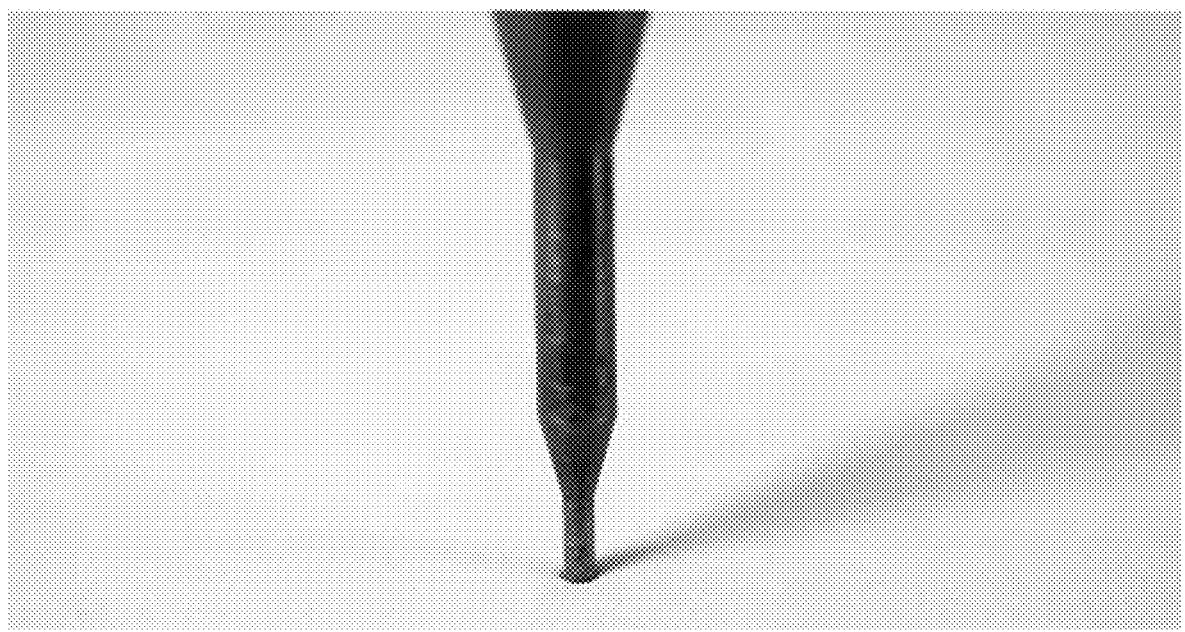
Figure 1C:
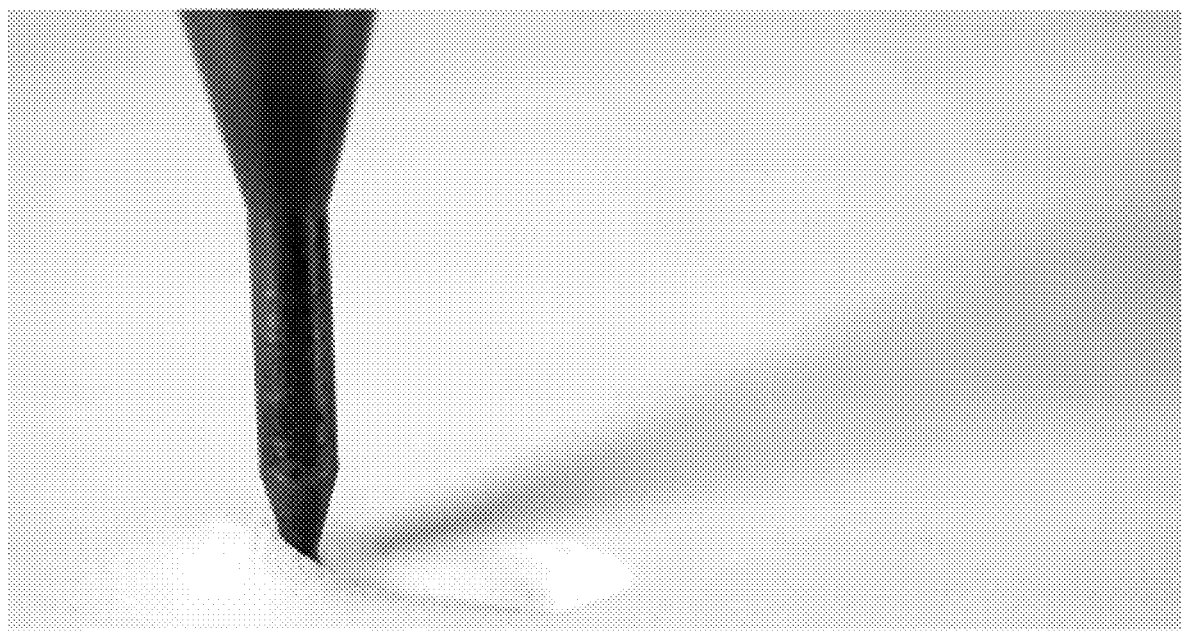
Figure 2:
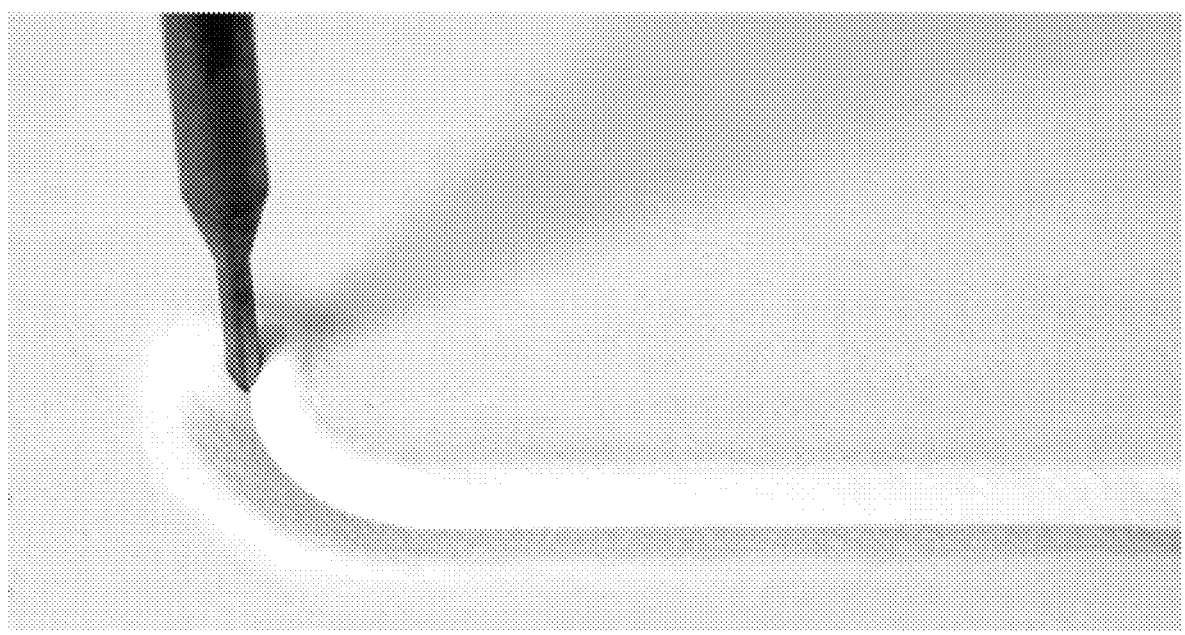
FIG. 2 is an image of liquid metal printing and shows a nozzle that has moved through powder along a curved path.
Figure 3A:
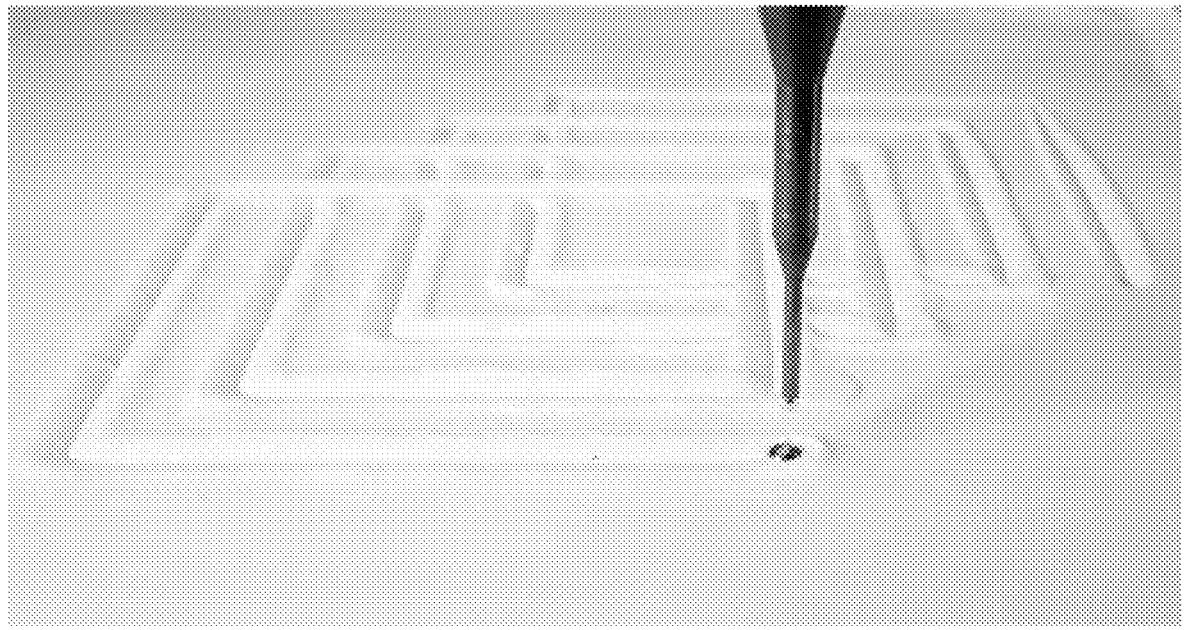
FIGS. 3A-C are images of liquid metal printing.
Figure 3B:
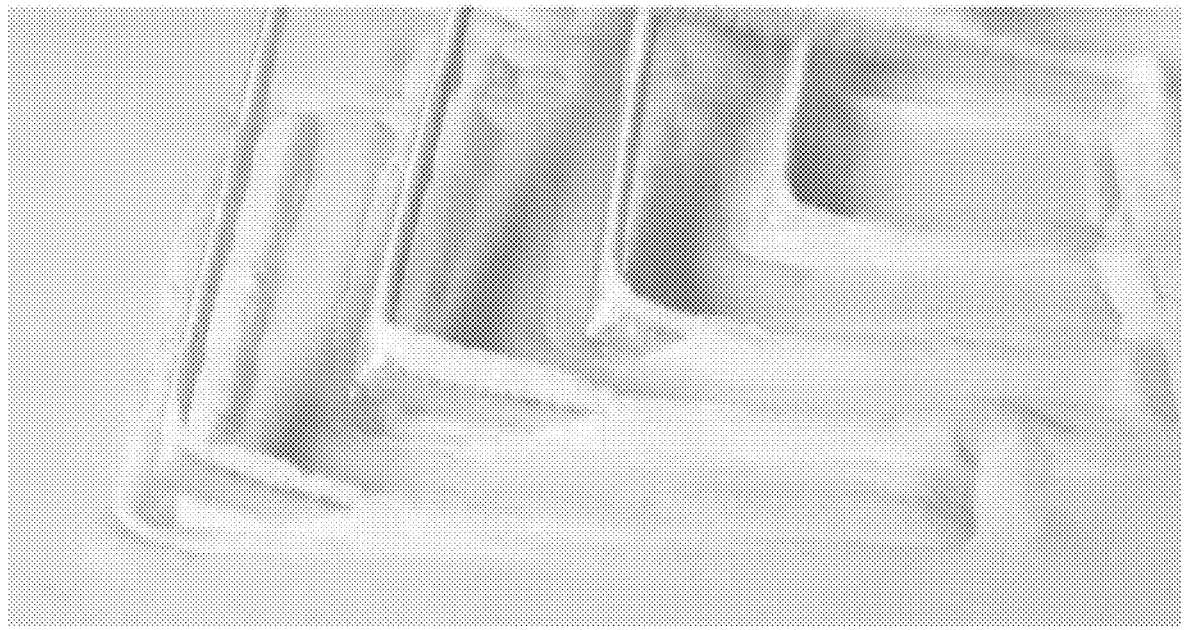
Figure 3C:
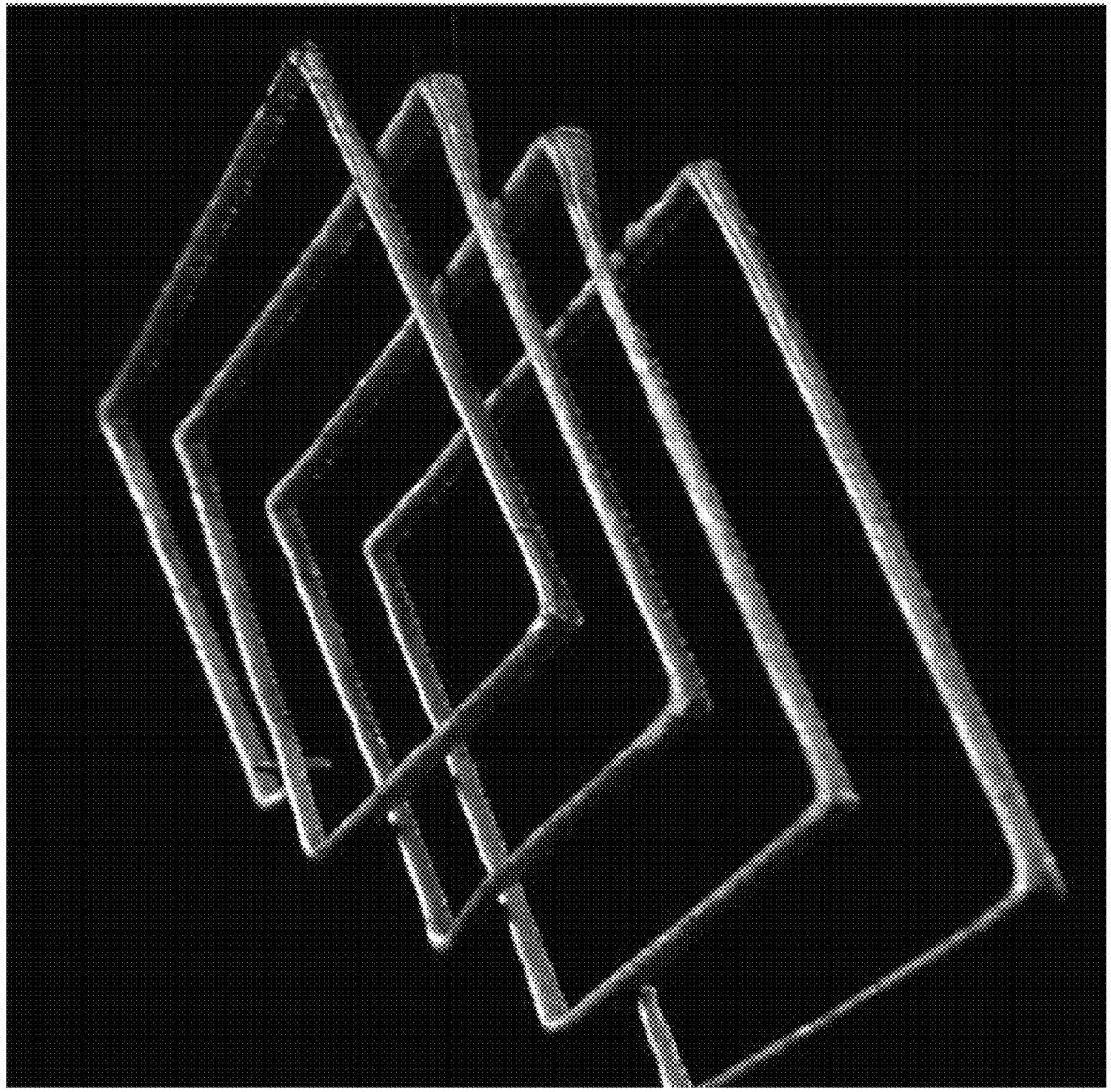
Figure 4:
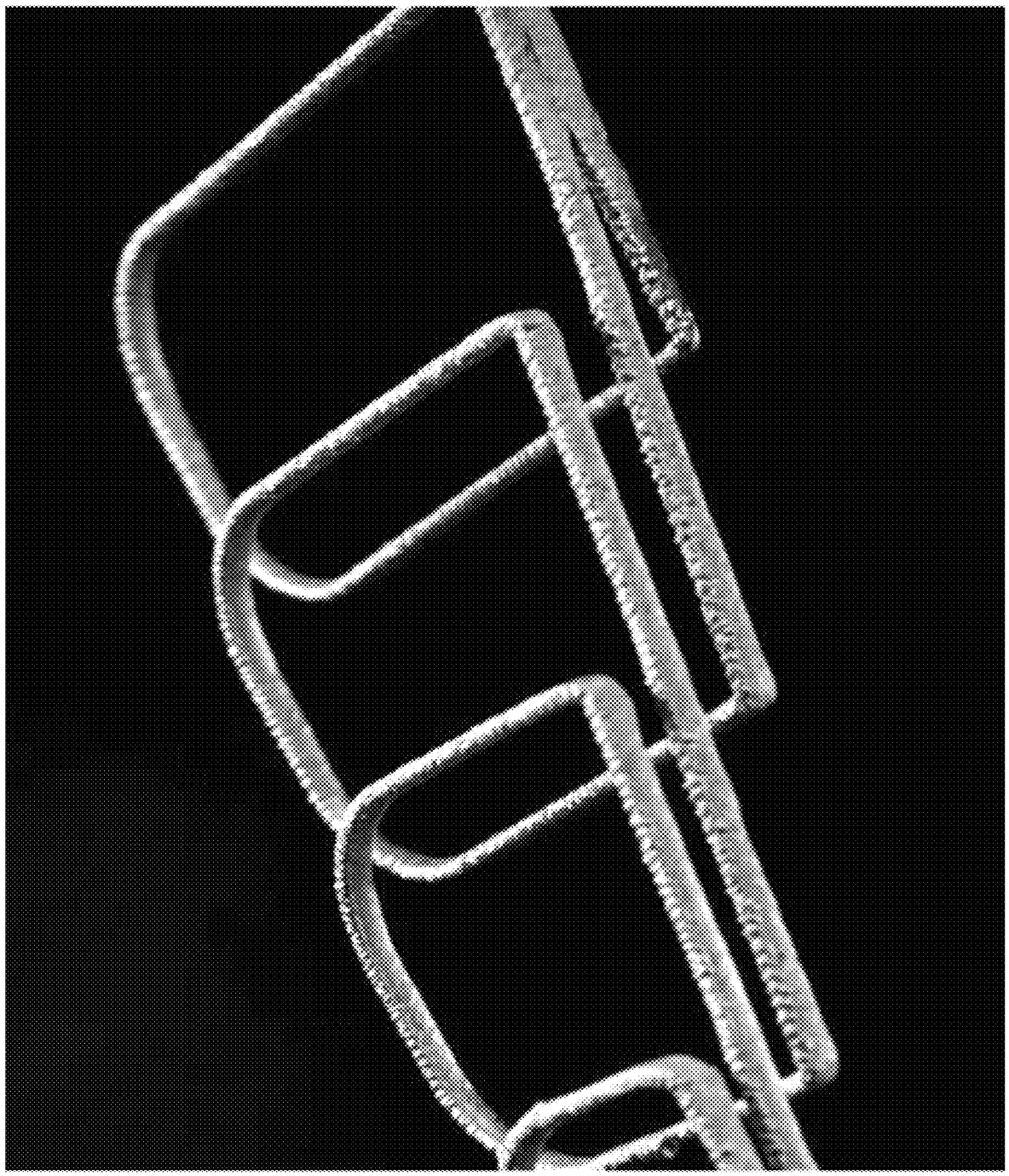
FIG. 4 shows a metal object formed by methods described herein.
Figure 5:
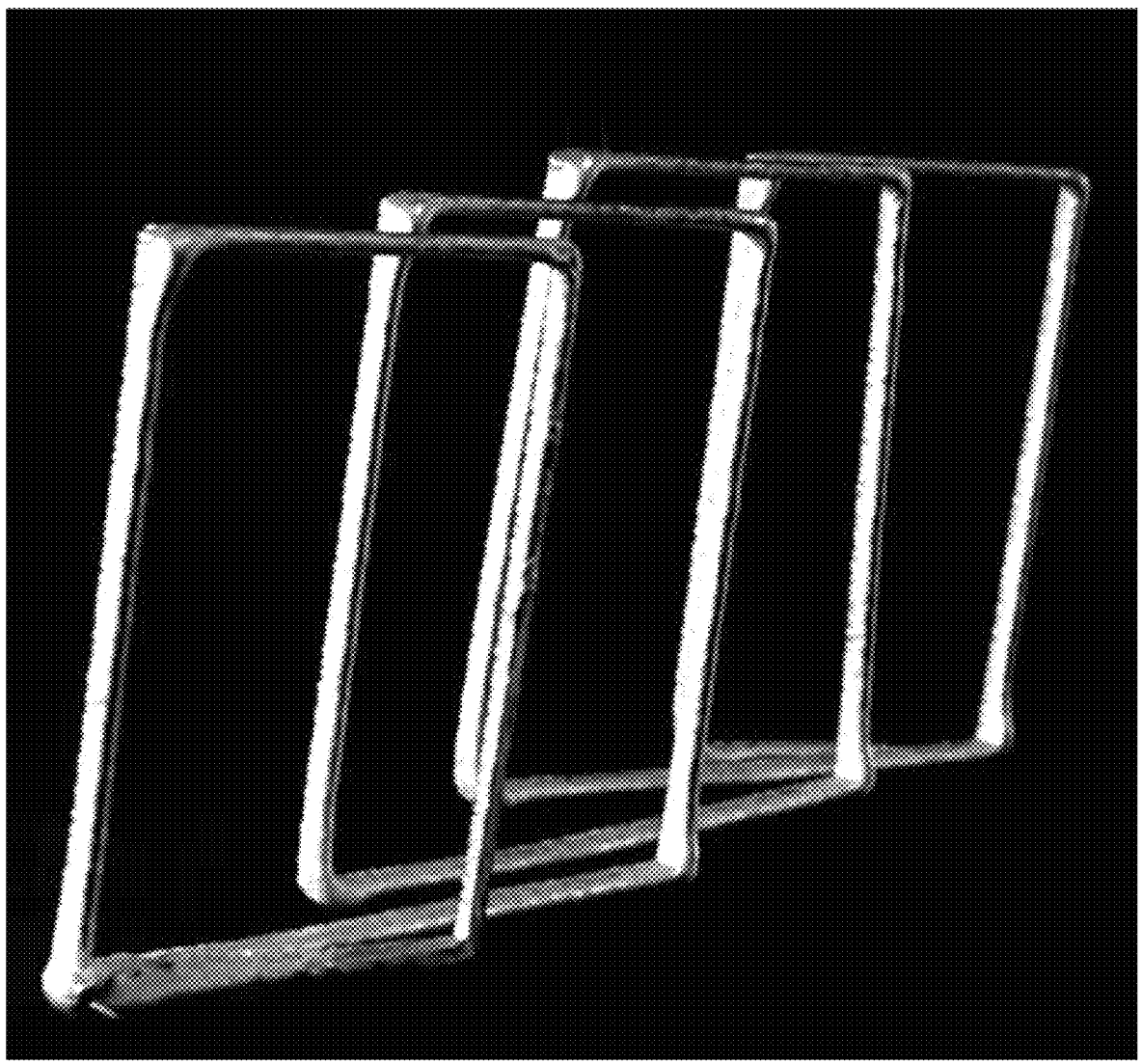
FIG. 5 shows a metal object formed by methods described herein.
Figure 6A:
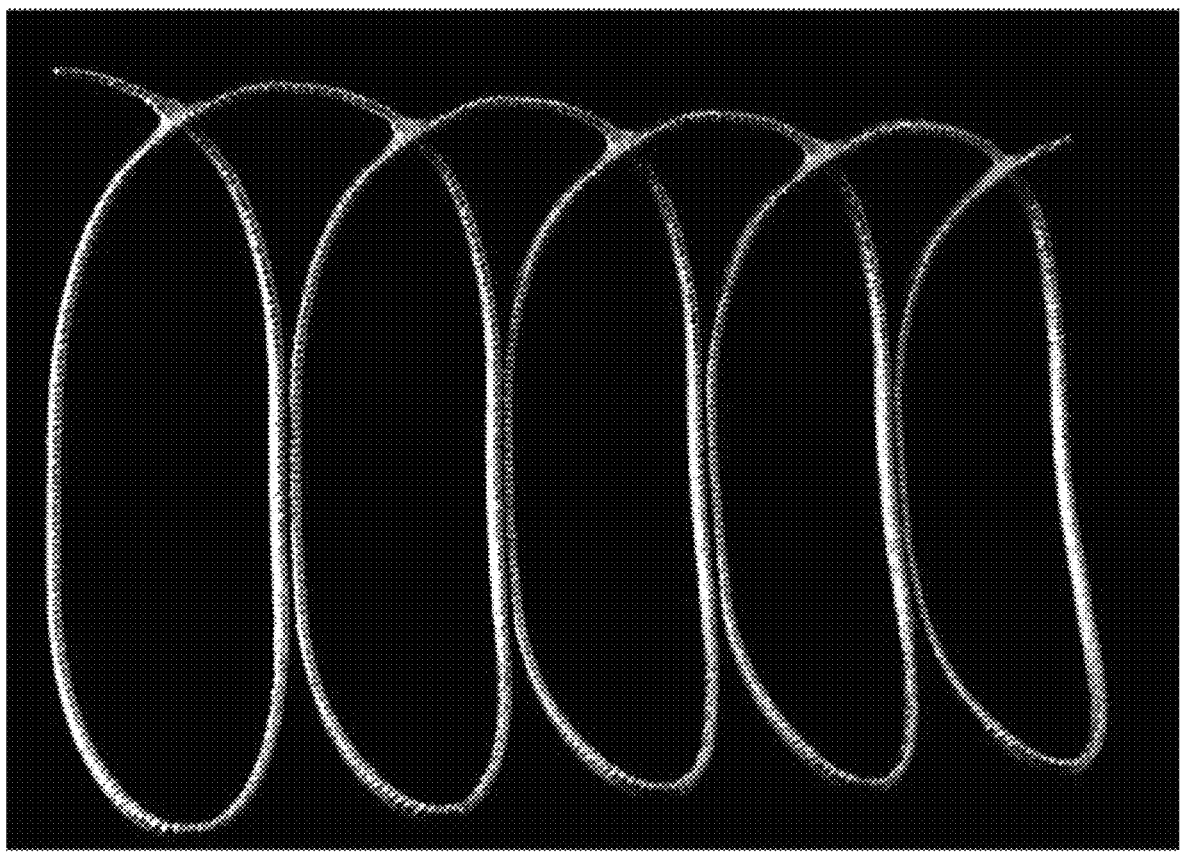
FIGS. 6A-C show a metal object formed by methods described herein.
Figure 6B:
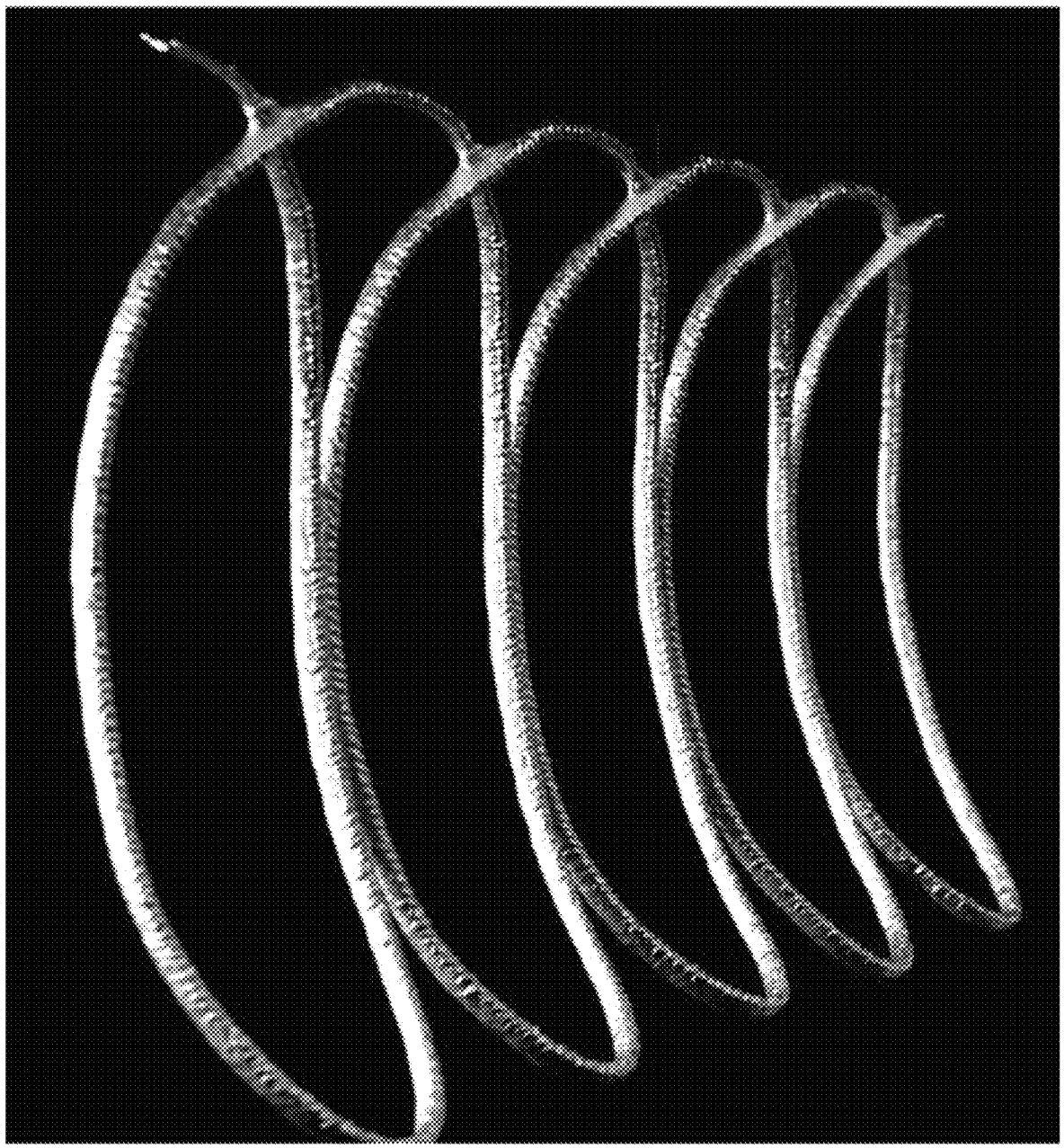
Figure 6C:
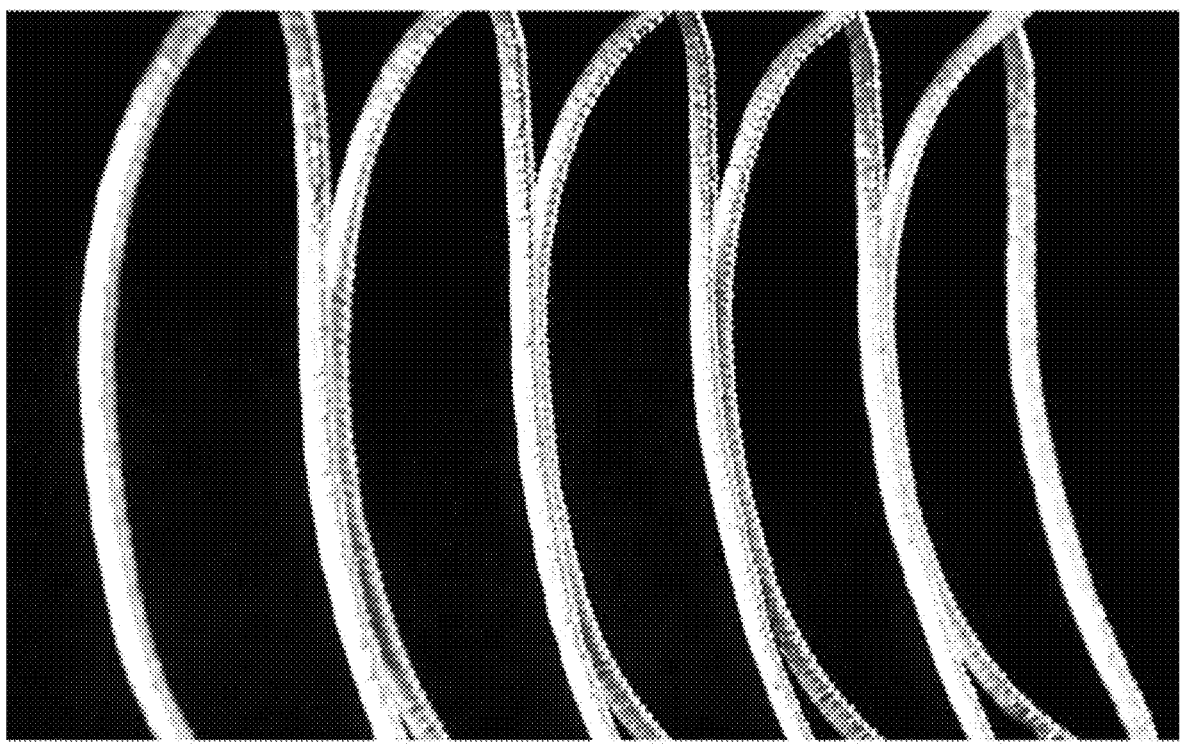
Figure 7A:
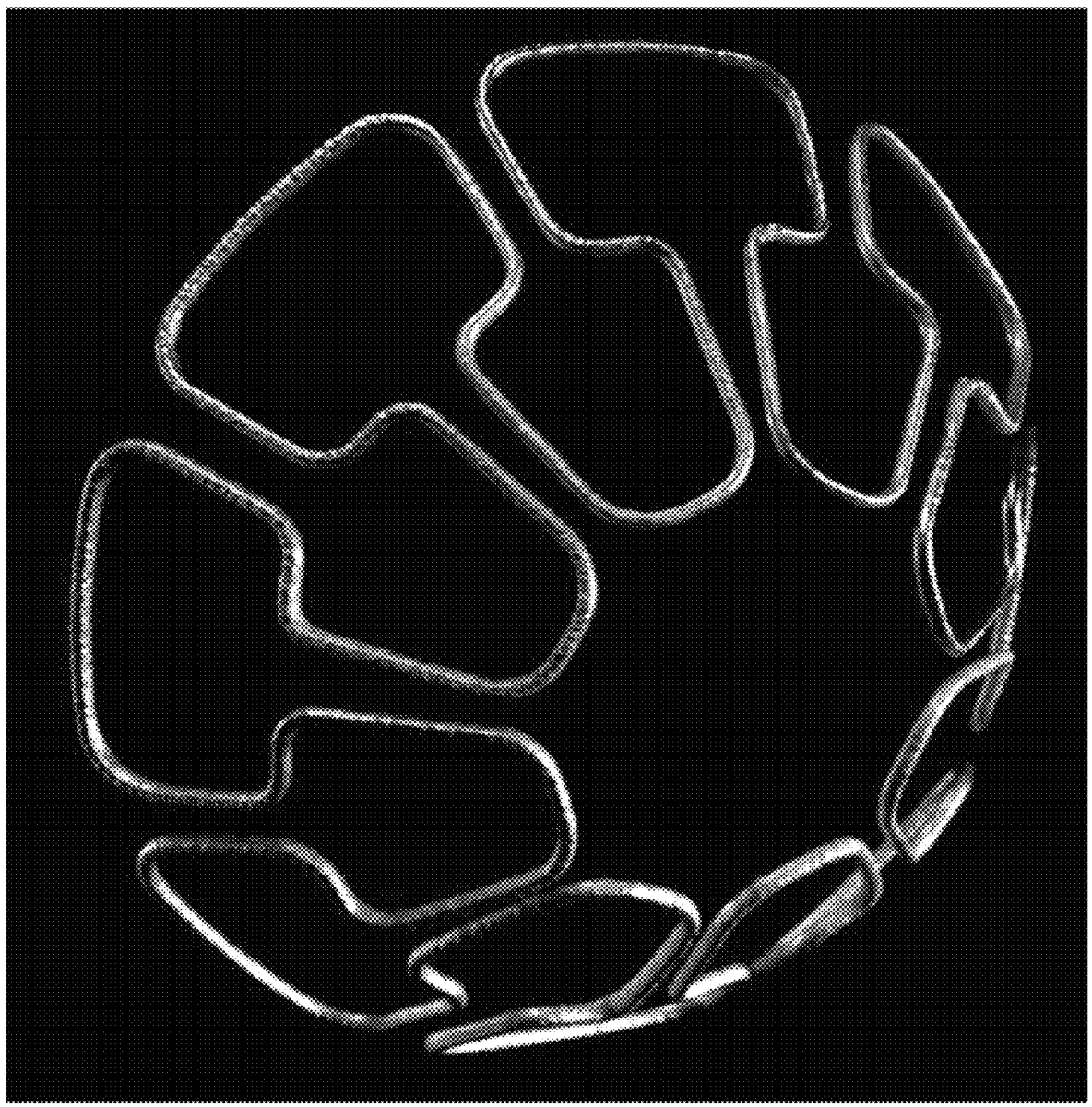
FIGS. 7A-C show a metal object formed by methods described herein.
Figure 7B:
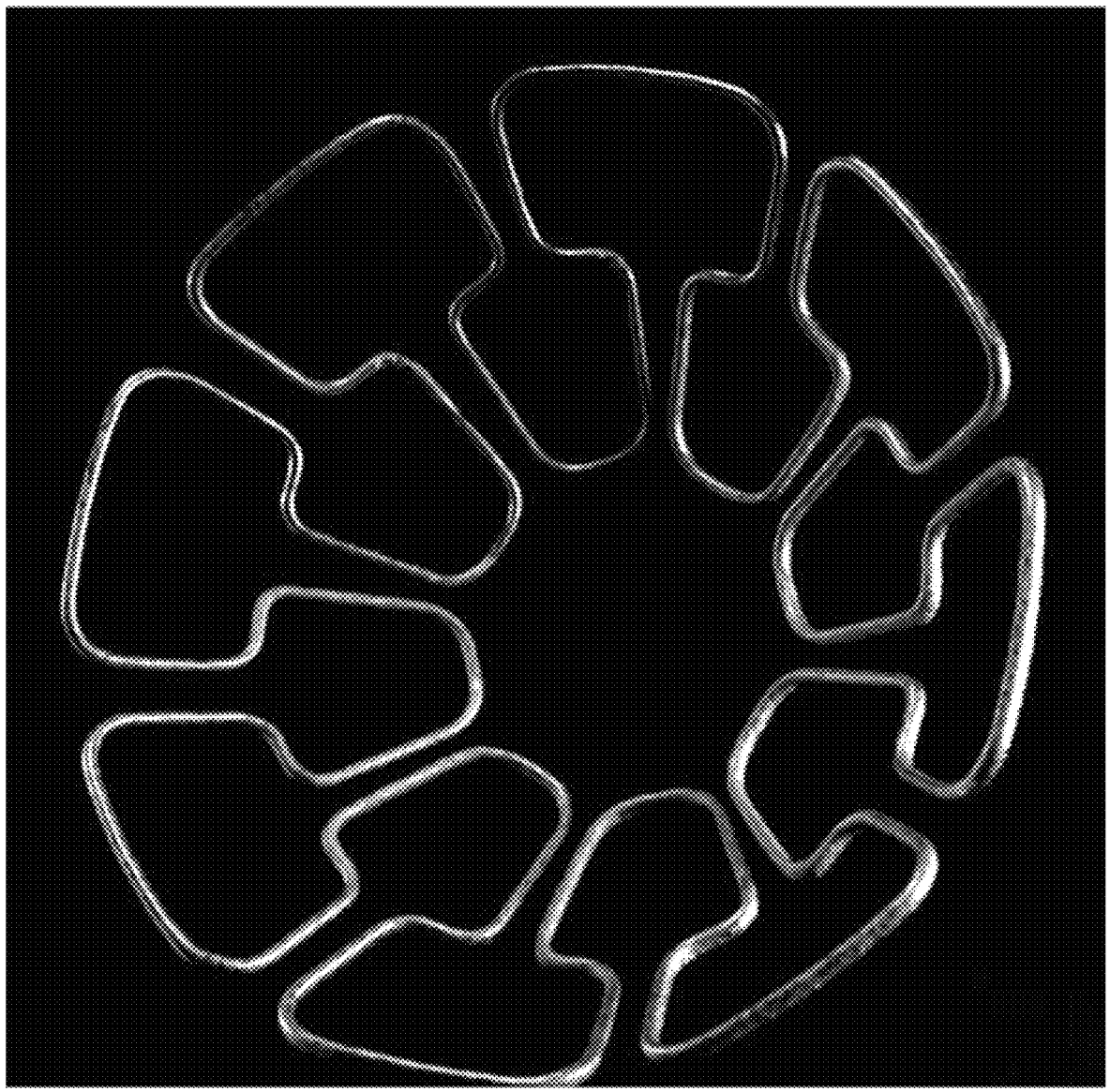
Figure 7C:
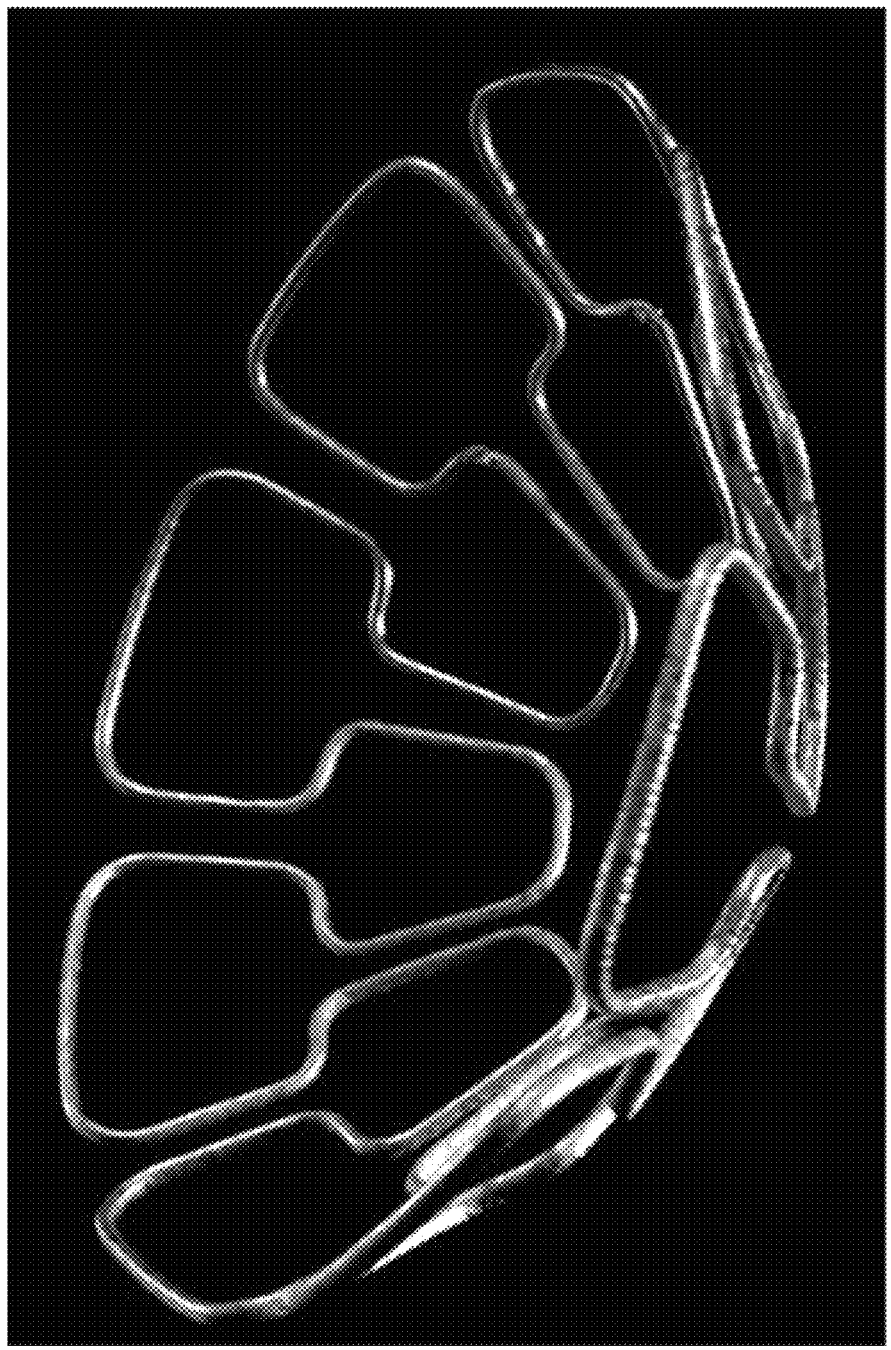

A description of example embodiments follows.

1. Liquid Deposition

1.1. Materials

The present invention uses a liquid deposition system to deposit high-temperature liquid metal or thermoplastics. This invention is unique compared to other printing processes because it allows for easy liquid material flow and deposition, faster printing speeds and the use of industrial high-quality, high-temperature materials. With liquid deposition of high-temperature materials within a powder suspension, we are able to print high-quality metals and thermoplastics, which are used heavily across many industries. Our process can extrude a variety of metals only limited by the melting temperature of the powder substrate. This could include pewter, aluminum, lead, tin, zinc, silver, copper, brass, bronze, gold, antimony and many others. For thermoplastics, our process can extrude Nylon, ABS, PLA, Acrylic, Polycarbonate, Polyethylene, Polystyrene, Polypropylene, TPU and various other materials.

By extruding in full three dimensions, rather than layer-by-layer we can get homogenous cross-sections that do not have a layered grain or orientation. Much like metal or plastic casting, our process could create stronger materials with a solid single extrusion, whereas traditional metal and plastic printing have a weak orientation which often breaks along the printed grain. Metal and thermoplastic materials are the industry standard across many types of products and components and today's printing processes do not compete in terms of surface finish, strength, print speeds, post-processing steps and a variety of other factors. Our process will allow for high-quality metal and thermoplastic prints that could be used in a variety of industrial applications and overcome the current limitations of traditional 3D printing.

1.2. Deposition

The present invention includes a reservoir to melt the material, a channel to move the material from the reservoir and a nozzle for extrusion. The process can use a nozzle of any shape to extrude the high-temperature liquid material. The nozzle sizes and shapes can accommodate different viscosities and different extrusion shapes or features sizes. For example, a more viscous material may require a larger nozzle awhile a less viscous material can use a smaller nozzle and lower pressure. The extrusion pressure can be created with either a gravity-fed system or pneumatics or mechanical actuation. The nozzle size can also increase the feature size of the printed part and allow for increased resolution, or increase the material quantity and speed to decrease the resolution. The speed of the deposition, size of the nozzle and the pressure in the cylinder are interrelated process variables. For example, to print faster, either the nozzle size or the pressure can be increased; otherwise, the volume of the material extruded from the nozzle will decrease as the machine moves faster. The shape of the nozzle can also vary to create different effects in the printed part, resembling a three-dimensional calligraphy technique. Circular, square, diamond-shape, U-shape, C-shape or virtually any other shape nozzle can be used to create different feature profiles. Any of the components can be used interchangeably in the system, or simultaneously. For example multiple nozzles can be used simultaneously to deposit two different materials at the same time. Or, different nozzles can be swapped out with a tool-changer to allow for the creation of a single, complex design with different feature sizes, materials and/or profiles.

The heated reservoir is set to the melting temperature of the selected material. Solid material is added to the heated reservoir and left in the reservoir until the material is melted to a liquid state. Once the material is fully liquid it can then be released from the reservoir to pass through a channel towards the nozzle. The channel can be the same diameter, larger or smaller than the nozzle to change the flow and quantity of material as well as the pressure. After moving through the channel the material is then extruded out of the nozzle and into the powder suspension bath where it is let to cool and solidify while the rest of the part is printed.

2. Powder Suspension Material

2.1. Composition

The powder suspension material can be made from salt, sand, silica or various other fine particles that can withstand high temperatures. The particle size of the powder will change the surface finish of the print. The larger the granular size of the particles the more course the surface finish, conversely, the smaller the particle size of the powder, the smoother the surface finish. The homogeneity of the powder and consistency of particle sizes is important for consistent movement and extrusion of the material as well as a consistently smooth surface finish. The powder should not clump or fuse to itself, as this will cause gaps or pockets to form with the extrusion material. The type of powder will also limit the melting temperature of the liquid extrusion material. For example, salt flour powder can be used as the suspension material for extruding high-temperature liquid materials that melt below 1400 F. The powder suspension bath can be heated or cooled to help either speed-up or slow-down the solidification of the extrusion material.

Figure 8A:
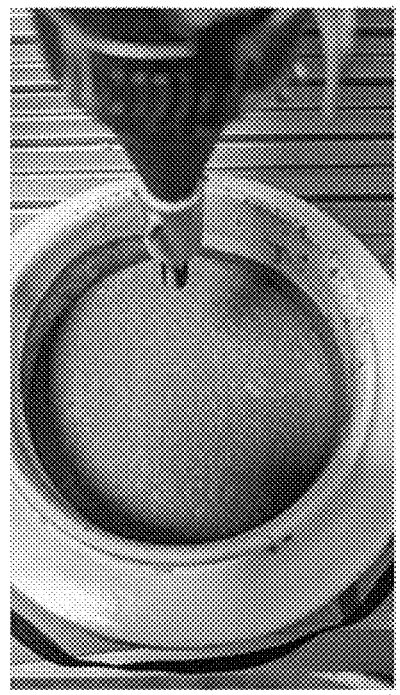
FIG. 8A-C show liquid metal printing in iron powder.
Figure 8B:
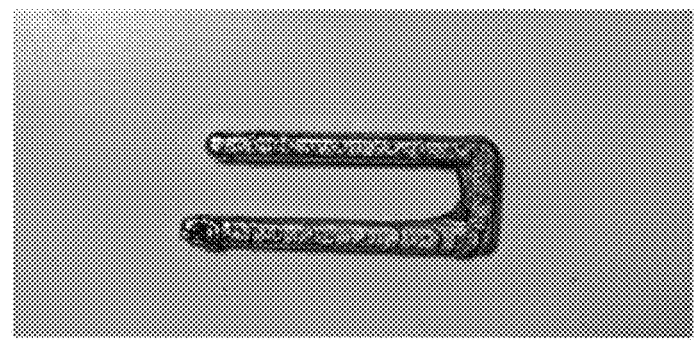
Figure 8C:
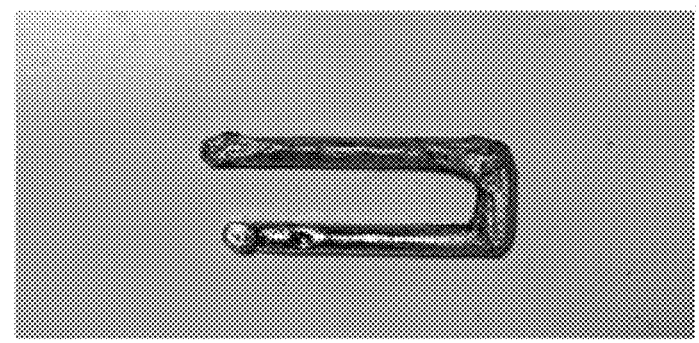
Figure 9:
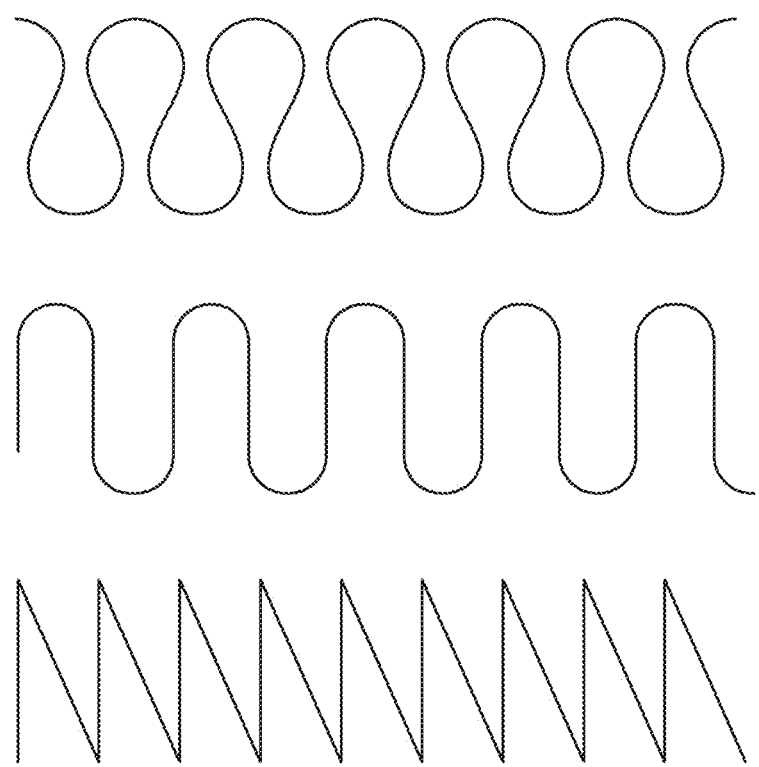
FIG. 9 illustrates curved and zig-zag patterns that can be printed by the methods described herein.
Figure 10A:
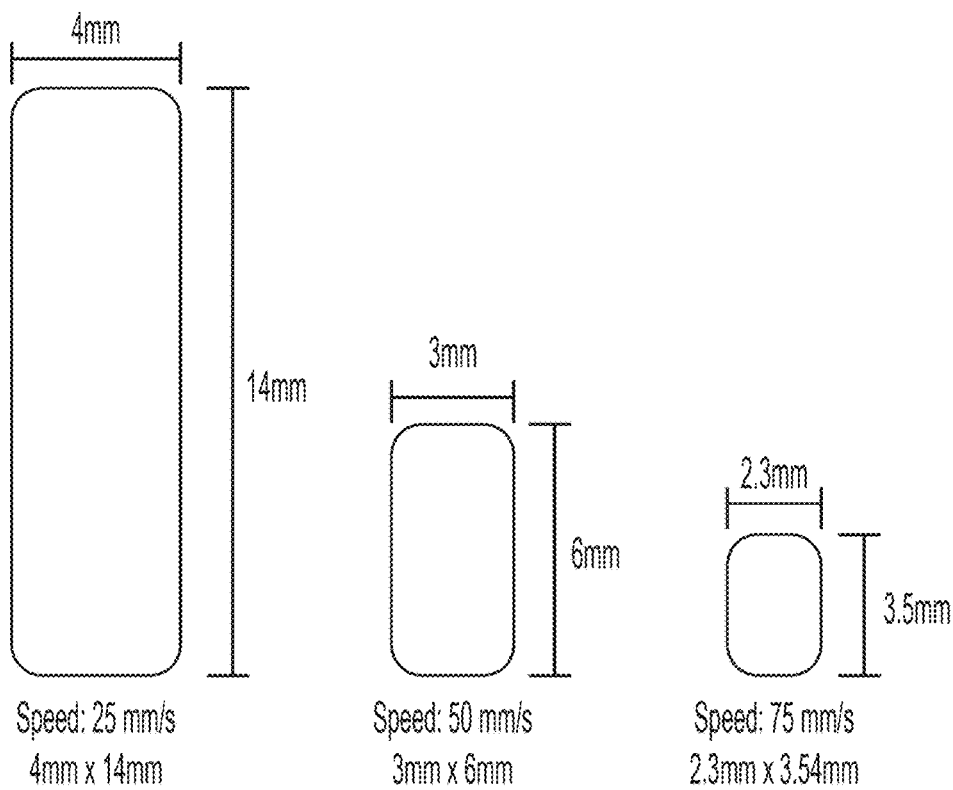
FIG. 10A illustrates metal lines printed at different speeds.
Figure 10B:
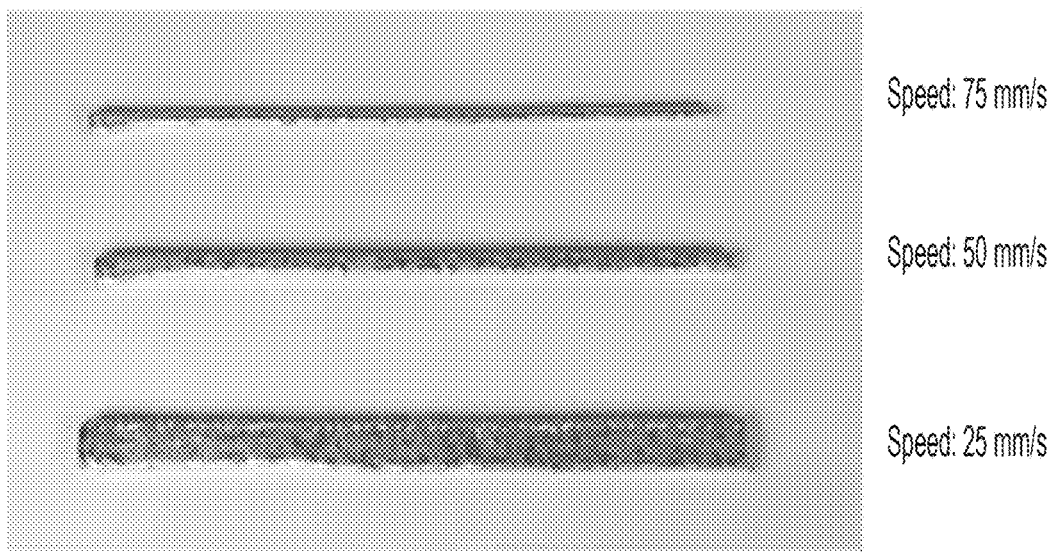
FIG. 10B is a photograph of metal lines printed at different speeds.

One suitable powder suspension material is powdered salt (e.g., sodium chloride), such as powdered salt having a diameter of about 25 microns. Due to the pressure over the print, the highest distance at which it can be printed is −85 mm from top of powder level. Printing closer to the surface result in an uneven surface, yielding a rougher exterior Another suitable powder suspension material is powdered iron, such as powdered iron having a particle diameter of about 5 microns. Iron powder has a smaller particle size and higher density than powdered salt. Consequently, printing can be performed closer to the surface with iron powder. FIG. 8A shows a nozzle above a container of iron powder. FIGS. 8B and 8C show opposite sides of an object formed by printing metal powder.

In general, smaller particles within the powder suspension yield a printed product with a smoother surface quality. A reasonable upper limit for the particle size is approximately 150 micrometer.

2.2. Controlling the Support of Objects

Extrusion within the powder support bath should happen below a certain distance threshold so as to ensure that the powder bath is compressed by its own weight and evenly distributed. The pressure of the powder helps to support the extrusion material. If the pressure is too low the liquid extrusion material can flow in any direction within the powder. Similarly, the liquid material can flow back towards the lowest point and start to expand the cross section of the printed part, creating larger areas. With too great of pressure within the powder suspension, the liquid material will not flow out of the nozzle and the machine will have difficulty moving the nozzle through the powder bath. The powder bath can be vibrated or aerated to help easily move the nozzle through the powder bath or to allow for easier more continuous extrusion of the liquid material.

3. Fabrication

3.1. Fabrication Machine

The liquid extrusion process within the powder suspension can be precisely controlled with at least a three-axis CNC machine. With a three-axis, gantry-style machine, the reservoir and nozzle are attached to the Z-axis, and three-dimensional structures can be printed within the powder. The nozzle can move freely in all three dimensions, however the nozzle can not rotate around the z-axis (when used on a three-axis machine), so the printed part is constrained to three-dimensional geometries with vertical nozzle orientations. If a machine with more than thee axes is used the printed parts can also include features where the nozzle can rotate freely rather than only printing from a vertical orientation. Other deposition machines are also possible like "delta" robots, cable bots, or even distributed printing processes with autonomous robots. This process does not require an extremely specific machine, rather it can accommodate just about any computer numerically controlled (CNC) machine that can move in three dimensions with multiple axes of control.

All of these methods can be scalable to large (many cubic meters) or small (cubic millimeters) print volumes with either high precision and/or high-speed depending on the application. If a small part with high precision is needed, a gantry-style machine can be used with extremely precise nozzles in a small powder volume. Conversely, if a very large-scale structure is needed, a large gantry-machine (10's of meters), or large industrial robot (5 meters+) can be used. Theoretically there is no limit to the size of the machine, however a large powder-bath is required and as the scale increases, the amount of powder required and the size of the container increases.

3.2. Extrusion Device

In the extrusion devices described herein, many of the components are formed of stainless steel since it is corrosion-resistant and has a high melting temperature. Corrosion resistance is an important feature, since in many instances the device is used in combination with a reservoir of powdered salt. Stainless steel also is also resistant to oxidation and resistant to alloying with other metals.

3.2.1. Extrusion Device with Melt Chamber

Figure 31A:
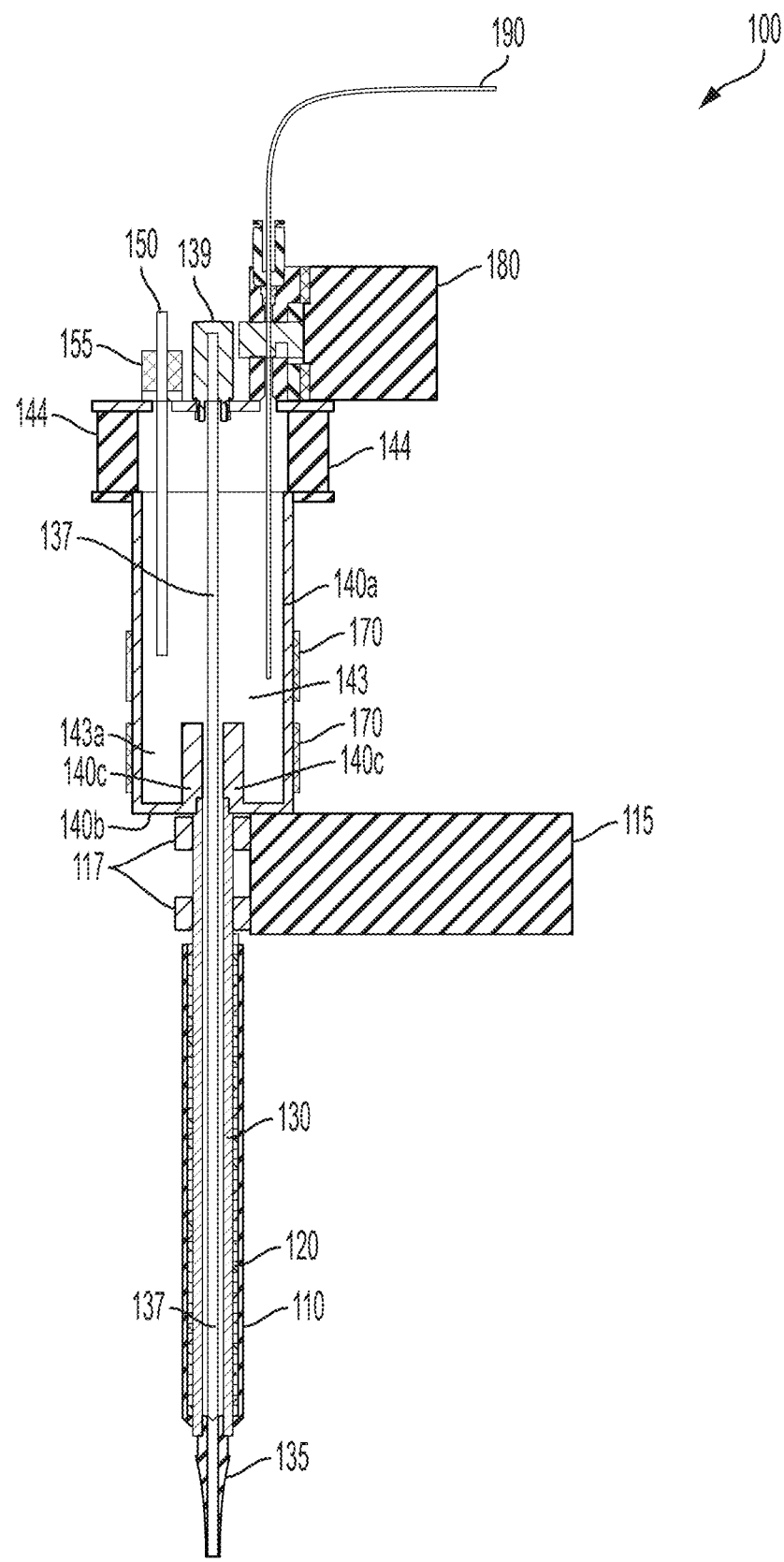
FIGS. 31A-C illustrate an embodiment of an extrusion device.
Figure 31B:
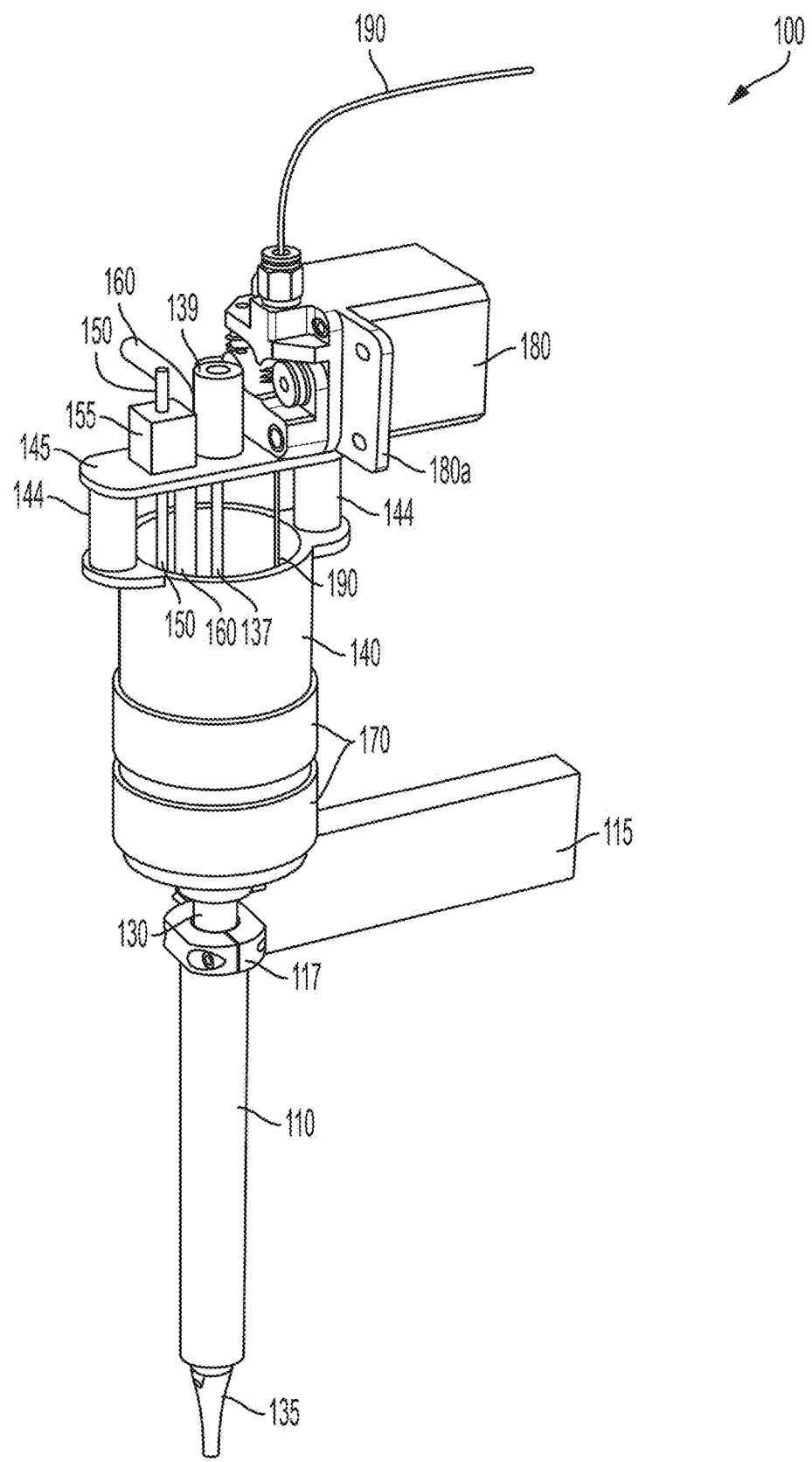
Figure 31C:
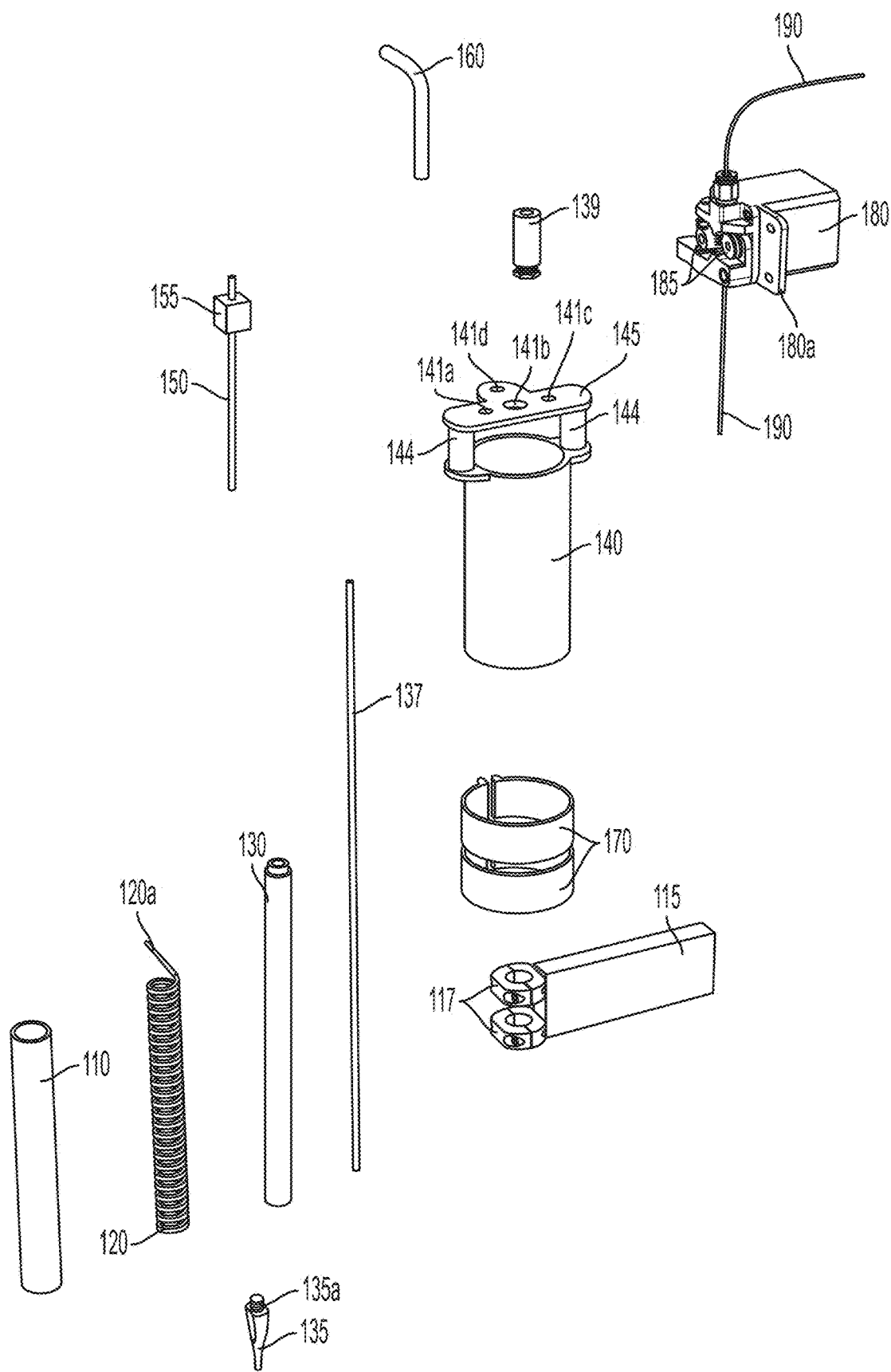

FIGS. 31A-C illustrate an embodiment of an extrusion device 100 for use in liquid metal printing. A crucible 140 forms an upper chamber 143 for holding liquid metal, and for this reason upper chamber 143 is sometimes referred to as a melt chamber. As illustrated, crucible 140 is cylindrical, but this geometry is not required. Two lobes extend outward from the top of crucible 140 and form the base of two supports 144 that extend upward to plank 145, which in turns supports components resting thereupon. In the embodiment of FIGS. 31A-C, the supports 144 are columnar, but other geometries are permissible. Crucible 140 has an exterior sidewall 140a, a base 140b, and an interior sidewall 140c, which collectively form a well 143a. One or more heating elements 170 surround crucible 140 to heat the crucible 140 and melt the metal therein. Preferably, heating elements 170 have an integrated thermocouple. Melted metal collects within well 143a and can flow into interior chamber 130. The well 143a ensures there is a minimum amount of melted metal within the upper chamber 143 of crucible 140 before melted metal flows into interior chamber 130. Maintaining a minimum amount of melted metal helps with heat management and provides better control of liquid flow rate. In other embodiments, the supports 144 are not included, such that crucible 140 is simply has a cap with apertures in the cap.

Plank 145 has four apertures (141a-d) to allow components to pass through plank 145. Aperture 141a is for probe 150. Aperture 141b is for solenoid 142. Aperture 141c is for wire feedstock 190. Aperture 141d, which is on a lobe that extends outward from plank 145, is for tube 160.

Probe 150 functions as a depth sensor for the volume of liquid metal within the upper chamber 143 and aids in maintaining a minimum level of molten metal within upper chamber 143. When probe 150 contacts liquid metal, a current flows between the probe 150 and crucible 140. If probe 150 does not contact liquid metal, there is no current. The presence or absence of current can be detected and used to control the motor that feeds additional wire feedstock 190 into the upper chamber 143. Alternatively, the motor can also be controlled by a computer numerical control (CNC) machine to add wire feedstock at a specified, predetermined rate or at a rate that correlates with the printing process. Support 155 fits snugly on probe 150, and the position of support 155 along the probe can be adjusted according to user preference. Support 155 is formed of a non-conductive material, such as a ceramic, which electrically insulates probe 150 from other components.

Solenoid 139 converts electrical energy into linear motion. The base of solenoid 139 connects with the top of rod 137, which extends downward through interior chamber 130. At a resting position, a spring mechanism within solenoid 139 depresses rod 137 downward so that the bottom of rod 137 contacts nozzle 135 to prevent liquid metal from flowing into nozzle 135. The solenoid 139 pulls thin rod 137 upward in order to allow liquid metal to flow into nozzle 135. Typically, thin rod 137 is formed of stainless steel. In operation, liquid metal flows through interior chamber 130 and into nozzle 135, from which it is deposited. Typically, interior chamber 130 is formed of stainless steel. Operation of the solenoid 139 can be controlled by a CNC machine. Rod 137 allows the extrusion device to quickly turn on and off the deposition of liquid metal in accordance with desired metal printing parameters.

Tube 160 provides an inlet for an inert gas (e.g., argon, carbon dioxide, sulfur hexafluoride, or helium) into the upper chamber 143. At high temperatures, the surface of the liquid metal can oxidize. Providing an inert gas atmosphere can reduce or prevent oxidation of the liquid metal.

Housing 180 provides a motor with gears 185 to propel metal feedstock wire 190 through aperture 141c and into the upper chamber 143 of the crucible 140. The motor can be controlled by probe 150. Housing 180 includes optional mounting bracket 180a.

Interior chamber 130 connects crucible 140 to nozzle 135. Heating element 120 wraps around the exterior of interior chamber 130. Preferably, heating element 120 includes an integrated thermocouple to measure temperature. Wire 120a supplies power to heating element 120 and a data connection to integrated thermocouple (if present). The heating element 120, interior chamber 130, and rod 137 fit within exterior chamber 110. In the embodiment of FIGS. 31A-C, a portion of interior chamber 130 extends above the top of the external chamber 110, such that interior chamber 130 is slotted through two-piece shaft collars 117, which clamp interior chamber 130 to bracket 115. In other embodiments, exterior chamber 110 is slotted through two-piece shaft collars 117, which clamp the exterior chamber 110 to bracket 115. Two-piece shaft collars 117 clamp together with bolts. Other mechanisms for clamping exterior chamber 110 to bracket 115 are suitable. The embodiment of FIGS. 31A-C uses two two-piece shaft collars, but only one is necessary. If desired, three or more can also be used. Bracket 115 is adapted to be gripped by a CNC machine, which moves the bracket 115, and consequently the nozzle 135, as programmed by the user.

In some embodiments, nozzle 135 has threaded portion 135a so that the nozzle 135 is removable from interior chamber 130, which has a mating threaded portion that receives threaded portion 135a of nozzle 135. Consequently, a wide variety of nozzles can be attached to the device, such as any of the nozzles of FIGS. 13A-D. The nozzles can be formed of a wide variety of metals, such as aluminum, copper, carbon steel, or stainless steel.

3.2.2. Continuous Feedstock Extrusion Device

Figure 32A:
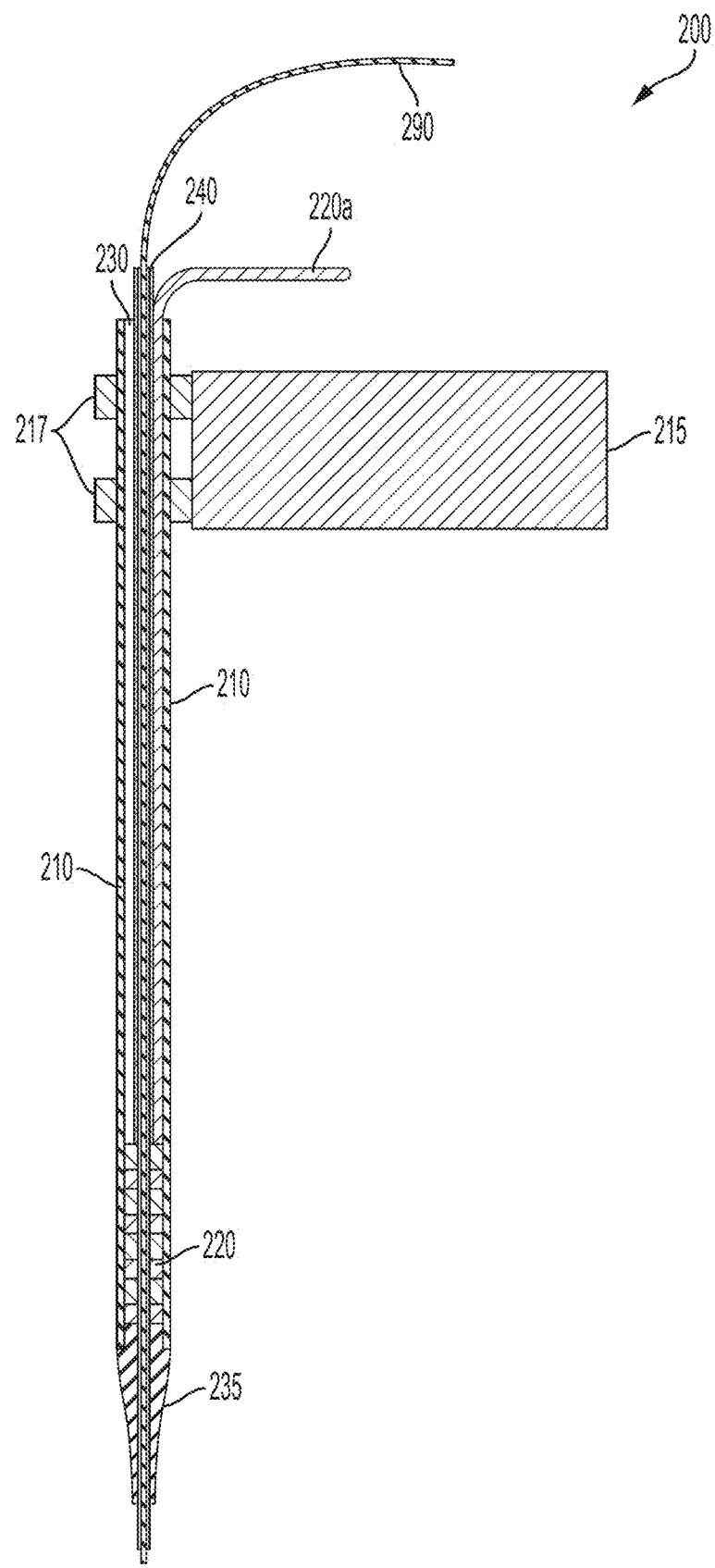
FIGS. 32A-B illustrate an embodiment of an extrusion device.
Figure 32B:
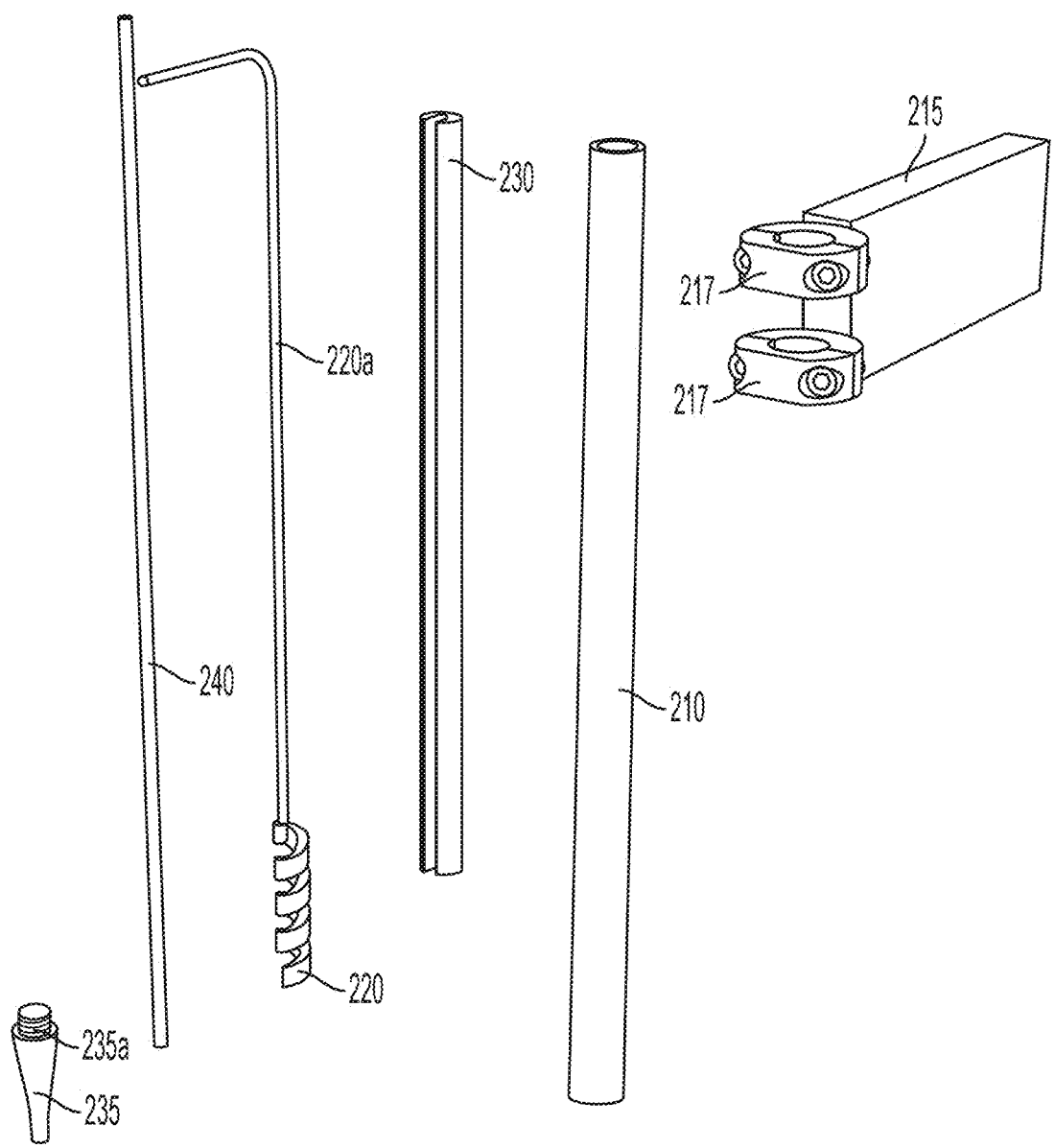

FIGS. 32A-B illustrate a continuous feedstock embodiment of an extrusion device 200 for use in liquid metal printing. In comparison to the embodiment of FIGS. 31A-C, the embodiment of FIGS. 32A-B does not have a crucible for holding liquid metal.

Wire feedstock 290 is inserted through thin hollow cylinder 240, which is formed of a non-porous material that can withstand high temperatures, such as a ceramic. Heating element 220 wraps around an end portion of hollow cylinder 240. Preferably, heating element 220 includes an integrated thermocouple. Wire 220a provides power to heater 220 and also provides a data connection for the integrated thermocouple.

Hollow cylinder 240 and wire 220a are inserted within the U-shaped cutout of sleeve 230. Heating element 220 protrudes from the bottom of sleeve 230. The hollow cylinder 240, heating element 220 with attached wire 220a, and sleeve 230 are inserted within exterior chamber 210. Hollow tube 240 can be brittle, especially if formed of ceramic, so the arrangement of FIGS. 32A-B protects the hollow tube 240.

Upper portion 235a of nozzle 235 connects with exterior chamber 210. Optionally, upper portion 235a is threaded to form a mating threaded connection with the bottom of exterior chamber 210.

In the embodiments of FIGS. 32A-B, exterior chamber 210 is slotted through two-piece shaft collars 217, which affix chamber 210 to bracket 215. Two-piece shaft collars 217 clamp together with bolts. Other mechanisms for affixing exterior chamber 210 to bracket 115 are suitable. The embodiment of FIGS. 32A-B uses two two-piece shaft collars, but only one is necessary. If desired, three or more can also be used. Bracket 215 is adapted to be gripped by a CNC machine, which moves the bracket, and consequently the nozzle, as programmed by the use.

A power supply provides power to heating element 220. The continuous feedstock device does not have a reservoir of liquid metal, but instead uses a metal wire feedstock 260 that feeds into the device. Pressure from the wire feedstock 260, which the operator can vary, controls flow rate out of the nozzle 230.

3.3. Fabrication Technique 3.3.1. Line Width

Line width can be modified through a number of techniques.

Nozzle: increasing the diameter of the nozzle tip increases the print width.

Speed: a decrease of speed results in more liquid metal printed, thus affecting both the width and depth of the print. Decreasing the speed results in an increase of not only the thickness of the print, but also the depth.

Pattern: a zig zag or curved pattern results in wider lines. This results in a denser print as more liquid metal is printed.

3.3.2. Surfaces

Line width can be modified through a number of techniques.

Figure 11A:
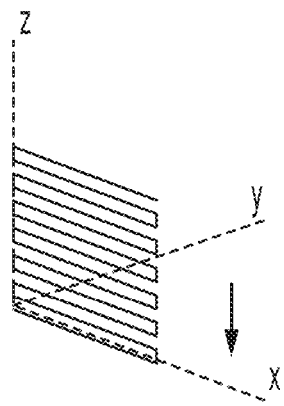
FIG. 11A illustrates printing on a vertical plane.
Figure 11B:
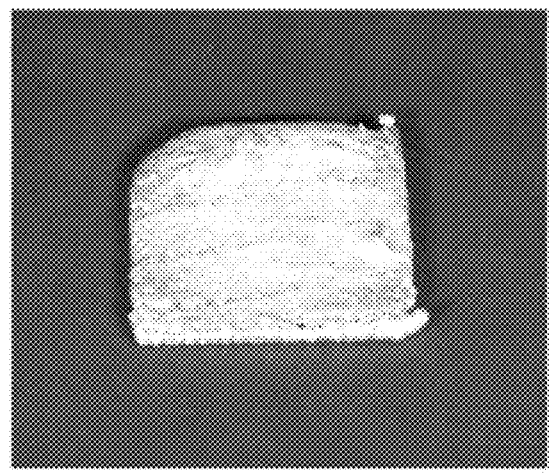
FIG. 11B is a photograph of continuous printing in a vertical plane.
Figure 11C:
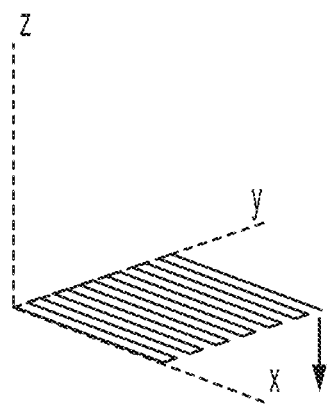
FIG. 11C illustrates printing on a horizontal plane.
Figure 11D:
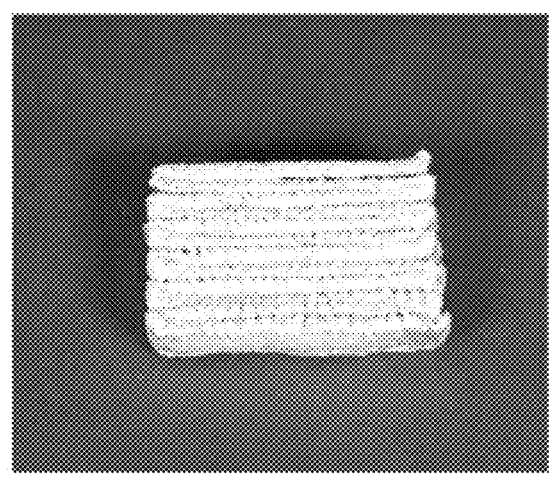
FIG. 11D is a photograph of continuous printing in a horizontal plane.

Vertical/Horizontal Printing (FIGS. 11A-D): Creating a surface by printing a tool path with close distance. The positioning of this affects the print. A vertical printing of these path results in a smoother surface, whereas printing it on a horizontal plane results in a clear distinction of the path. Albeit joining, the surface has a clear pattern revealing the tool paths. Therefore, if the desired surface result is a smoother one, it is recommended it be printed in the vertical plane. However, a horizontal printing allows for a pattern design within the surface which might be desired in some cases. As illustrated in FIG. 11B, printing on the vertical plane results in gravity acting as a further force to join the lines together. The result is a smoother and narrower surface (include dimensions to compare). As illustrated in FIG. 11D, printing on the horizontal plane results in a patternization within the surface, with a larger width due to gravity being perpendicular to the direction of the print.

Figure 12A:
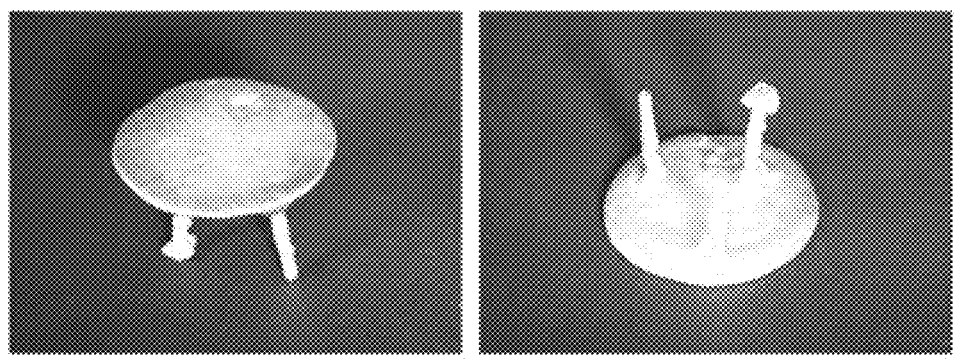
FIG. 12A is photographs of printing within powder and on top of powder.
Figure 12B:
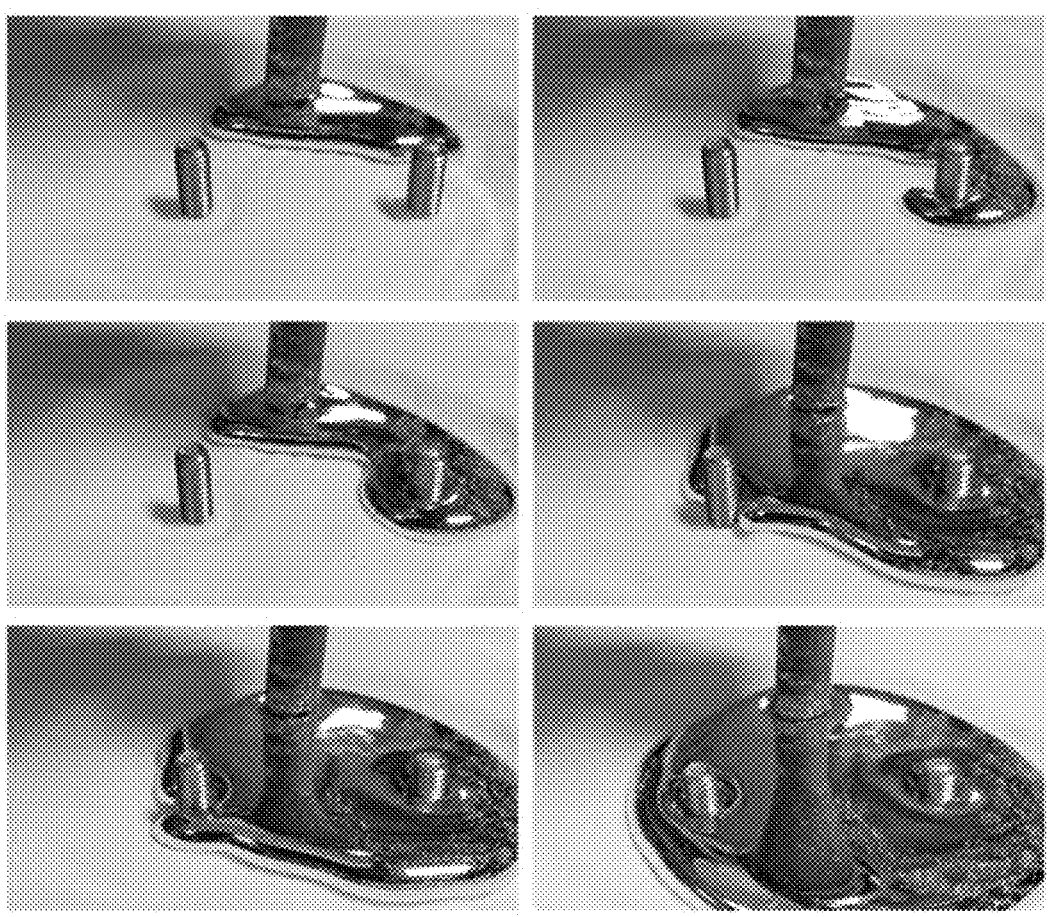
FIG. 12B is photographs of printing on the surface of the powder with objects inserted within the powder.

Over Powder Surface (FIGS. 12A and 12B): Printing over the powder surface results in a smooth surface. Milling the powder surface prior to printing creates opportunities for creating the desired finish of the print. In FIG. 12B, the screws can be removed after the metal cools, thereby leaving screw holes.

Combination Method: Combining printing over the surface with printing within the powder allows for three-dimensional objects to be produced.

3.3.3. Nozzle Designs

Effect of Nozzle Design in Liquid Metal Printing

Factors: Nozzle diameter; loss of resolution and heat; and nozzle shape.

Nozzle Diameter & Shape: Nozzle size and shape affect the final printed result. The diameter of the nozzle is one of the main factors affecting the print resolution. The size directly dictates the horizontal resolution and affects the layer thickness, which determines vertical resolution. A larger nozzle increases the thickness of the print, thus decreasing the resolution. This type of nozzle allows for an increase of speed in the printing. A smaller nozzle decreases the thickness of the print resulting in a higher resolution, but decreasing the speed of the print given that less material is being printed.

Loss of Resolution and Heat: A larger nozzle diameter results in a lower resolution. Since the nozzle is large, the vertical resolution decreases, which make larger nozzles more feasible for projects where details are less important. Large nozzles also have the disadvantage of heat loss due to the wide nozzle diameter and the quicker flow rate.

Figure 13A:
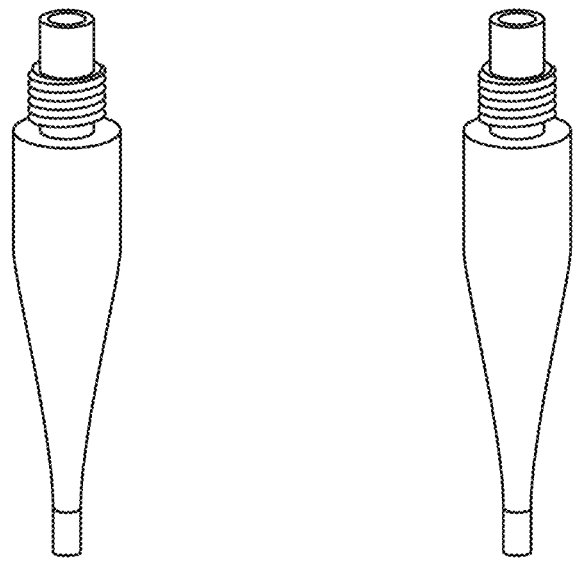
FIGS. 13A-D are schematics for nozzles.
Figure 13B:
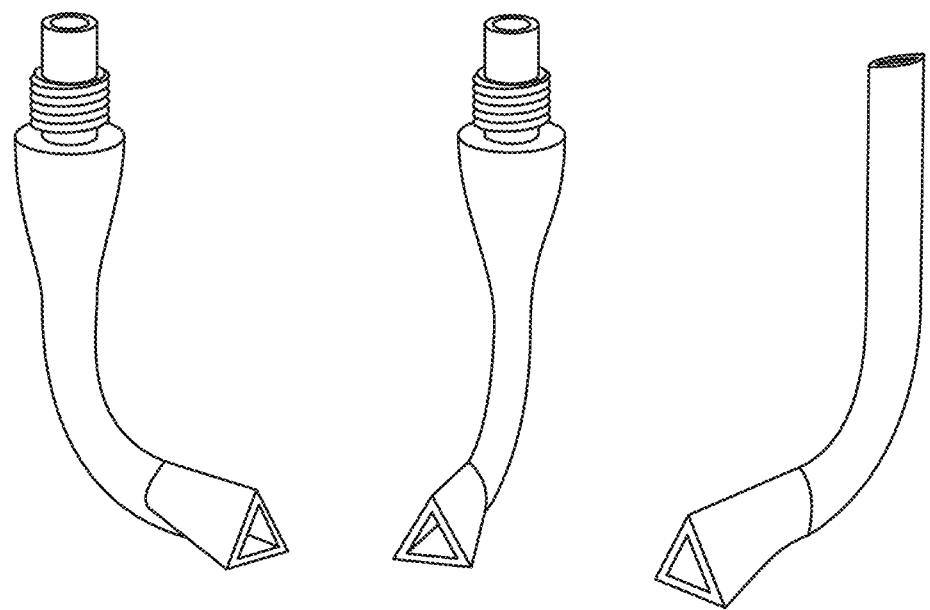
Figure 13C:
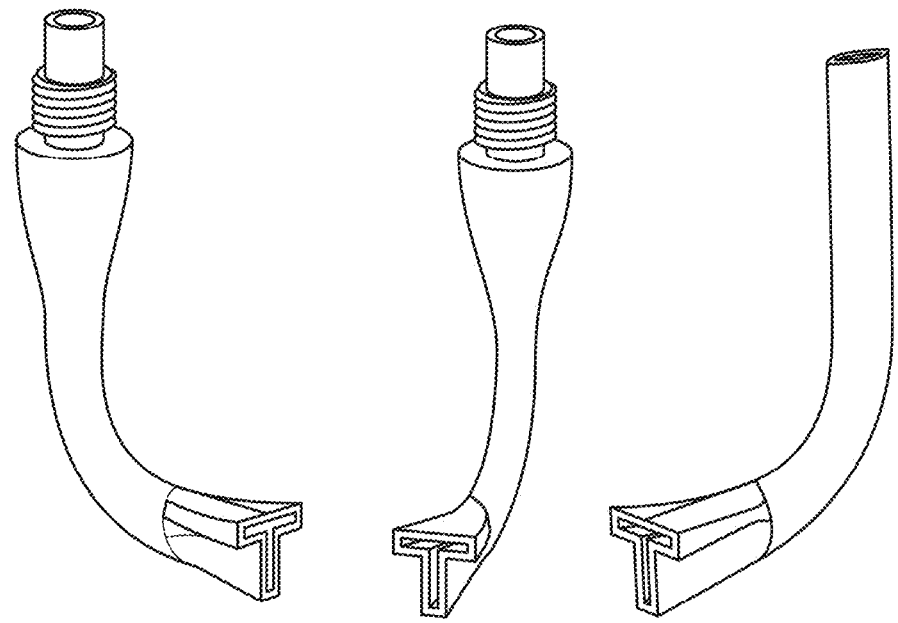
Figure 13D:
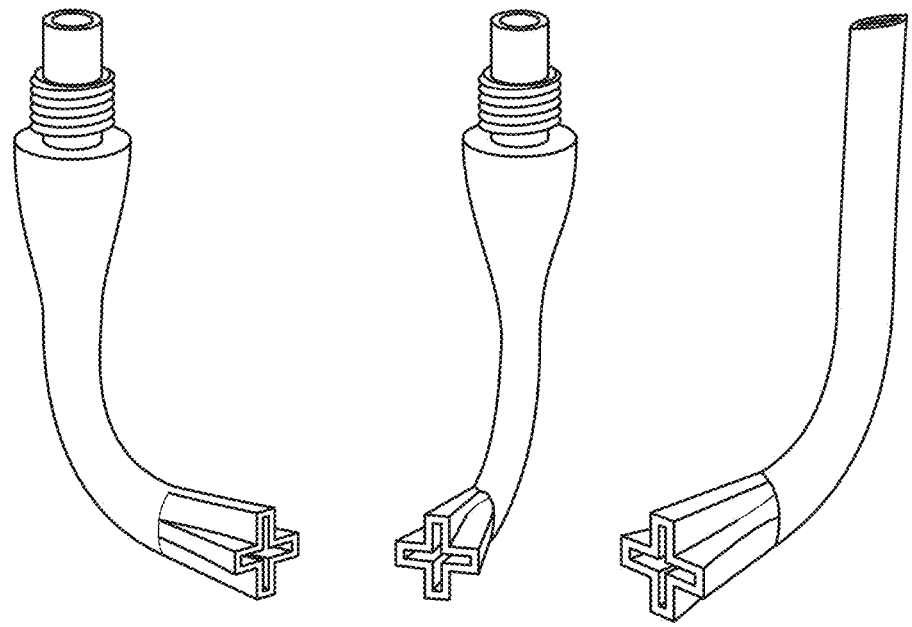

FIGS. 13A-D illustrate examples of nozzles. FIG. 13A is a straight nozzle. FIGS. 13B-D are L-shaped nozzles. As an L-shaped nozzle moves through the support medium, the nozzle creates a cavity through the support medium, which can produce improved results when printing. The L-shaped nozzles can also have an opening with a circular cross-section FIG. 13B. The straight nozzle of FIG. 13A can have an opening with a circular cross-section. Alternatively the straight nozzle of FIG. 13A can have an opening shaped as in any of FIGS. 13B-D.

As illustrated in FIGS. 13A-D, the nozzles can be threaded for so that they can be easily interchanged on the deposition device.

3.3.4. Depth to Angle Relationship

Relation of depth and angle of print on resolution.

Factors: Depth; Angle

Tests on the relation between the depth and the angle of the print (relative to force of gravity) have been made in order to see its effect on the resolution of the print. A further graph explores the minimum depth at which specific angles can be printed in or der not to compromise the quality of the print.

The deeper the print, the higher the resolution given the pressure over the print. The less particles displaced, the finer the print, and thus the greater the resolution.

Figure 14A:
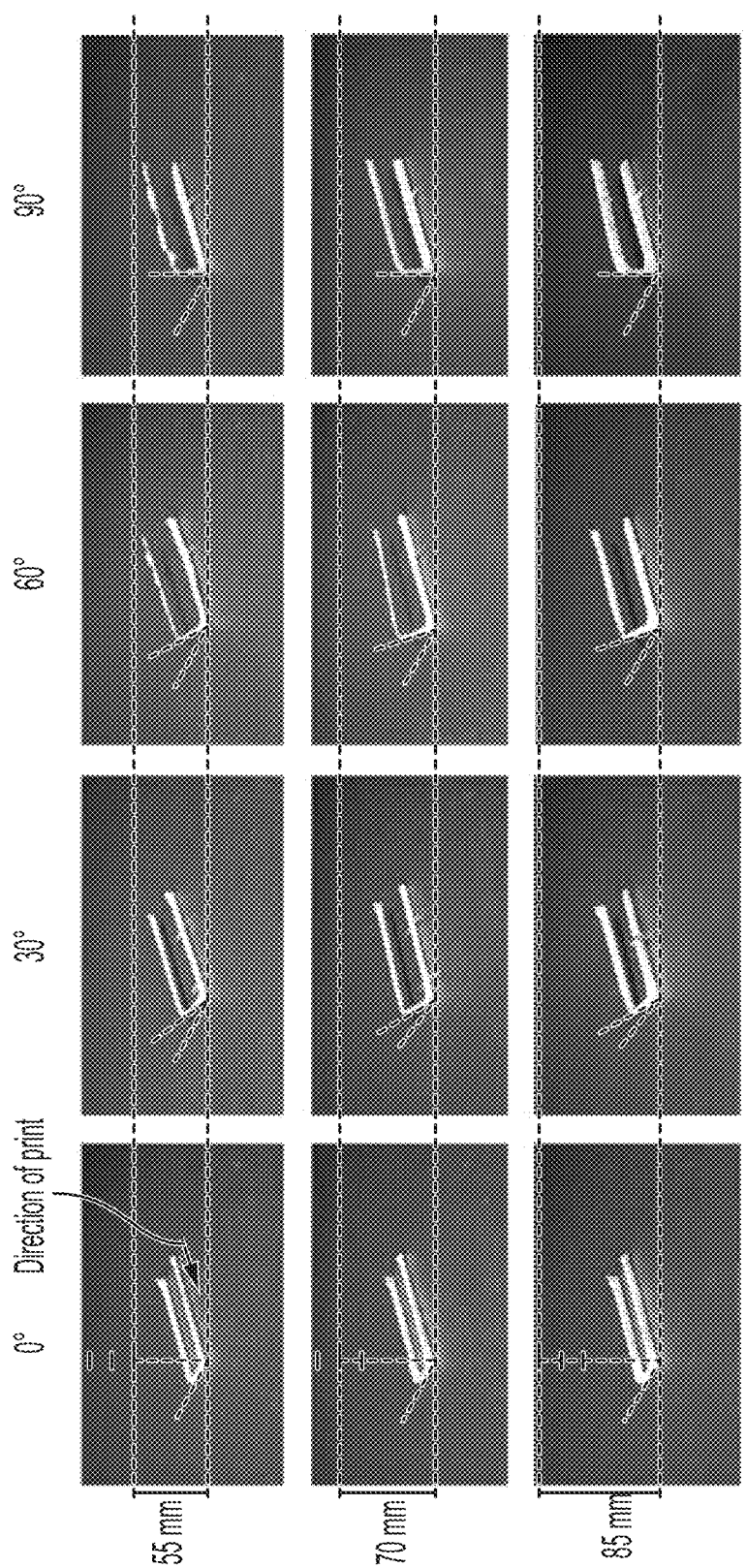
FIG. 14A is photographs of objects printed at varying depths and angles.

FIG. 14A is photographs of objects printed at varying depths and angles. The vertical axis is depth below the surface of the powder support material. The top row is printed 55 mm below the surface of the powder suspension. The middle row is printed 70 mm below the surface of the powder suspension. The bottom row is printed 85 mm below the surface of the powder suspension. In general, the deeper the print below the surface, the greater the angle that can be printed. As one comparison, the photograph at the upper right corner shows a ragged surface on top, while the photograph at the lower right corner shows less ragged surface.

Figure 14B:
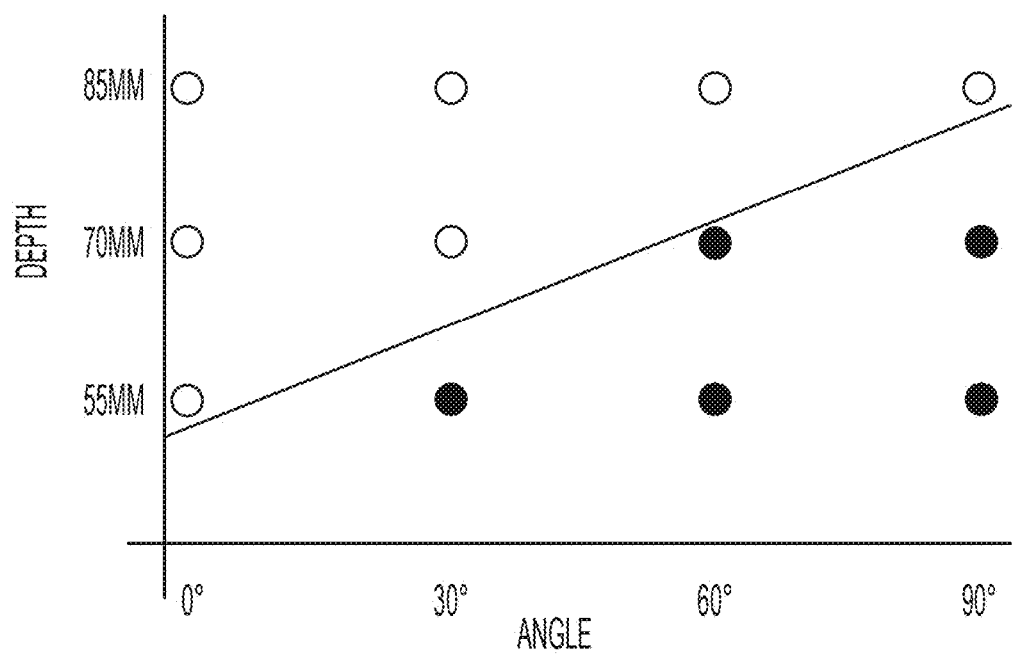
FIG. 14B is a graph of depth vs. angle.

FIG. 14B is a graph of depth vs. angle based on the FIG. 14A. In FIG. 14B, the data points above the line represent suitable print quality, whereas those below the line were not suitable. FIGS. 14A and 14B pertain to printing liquid pewter in a powder suspension of salt flour that has a particle diameter of diameter 25 microns. Without wishing to be bound by theory, at a greater depth below the surface, the powdered support provides additional pressure that prevents the liquid metal from flowing. Since the liquid metal does not flow, the printed pro of the powdered support, the

3.3.5. Joining Methods

Joint types for liquid printed metal depend on time and speed.

Factors: Time, Distance, and Joint Type

In the process of liquid metal printing there are various factors affecting the joint quality and strength. First of all, time plays a main role in the joint type to be used. The state of the liquid in the process of solidifying result in different qualities of each joining method, and therefore needs to be explored in detail.

Incorporating a joint within the process of liquid metal printing allows for faster assembly than adding post-production joints, eliminating manual labour and offering time savings.

Various tests have explored ways of reducing distortions at joints. The more invasive the joint type the higher the distortion. The following tests therefore explore the extent that each factor has on the final joint type.

3.3.5.1: Joining on the Same Plane

Intersecting two paths on the same plane results in the distortion of the print. As a result, the next tests all explore different methods of joining in different planes, avoiding the above issue.

In this print, material was extruded for two seconds in an attempt to create a stronger joint, however, excess material distorted even further the final printed result.

FIGS. 15A-D illustrate joining on the same plane. FIGS. 15A-D demonstrate that the nozzle tip can pass through a previously-deposited section that is still liquid, thereby joining two portions. However, this process can inadvertently incorporate the suspension material into the product that is formed.

3.3.5.2: Joining on Different Planes—A

Intersecting paths on different planes results no collisions and therefore not disruption of the original print. Given that the paths need to intersect in some way to allow for the joint to occur, different joint designs have been tested. Albeit all successful at creating a strong junction, aesthetic levels vary. The following tests explore the success of each joint design.

Figure 16A:
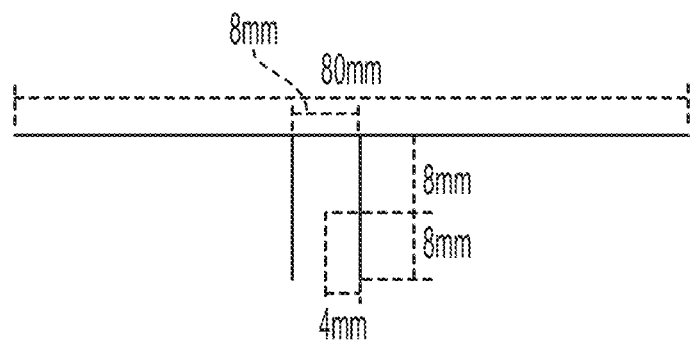
FIGS. 16A-D illustrate joining on different planes.
Figure 16B:
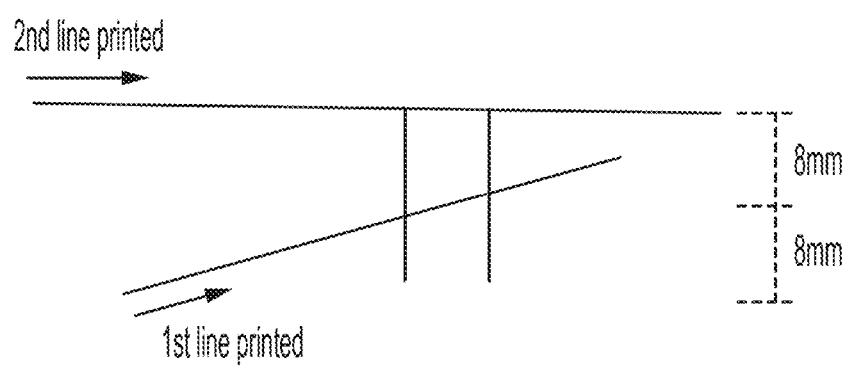
Figure 16C:
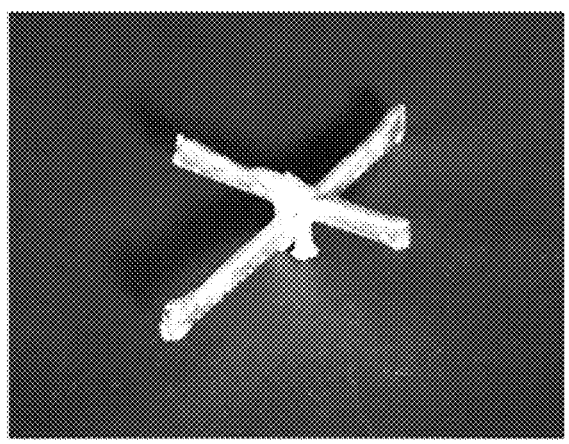
Figure 16D:
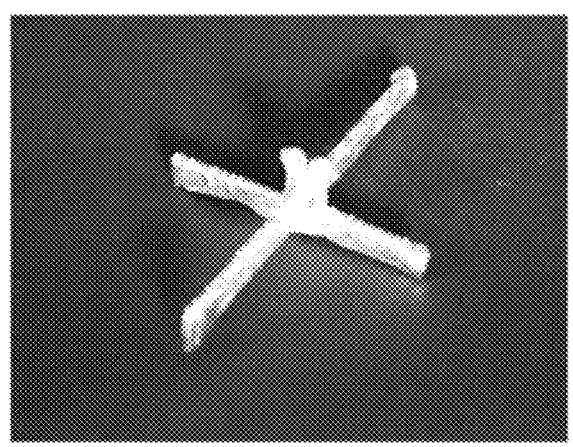

FIGS. 16A-D illustrate joining on different planes. In this process, a first line is printed. A second line is printed, in which two downward spikes are formed on opposing sides of, and adjacent to, the first line. The process joins the first and second lines together, as shown in the photographs of FIGS. 16C-D.

3.3.5.3: Joining on Different Planes—B

Out of the joint designs this one seems to be the smoothest joint, and therefore it is the one chosen for the further explorations under "grid designs."

Figure 17A:
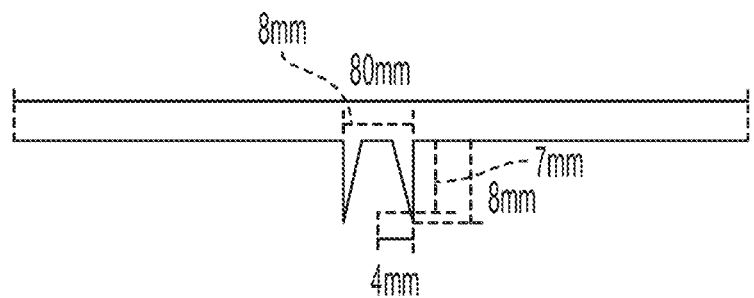
FIGS. 17A-D illustrate joining on the same plane.
Figure 17B:
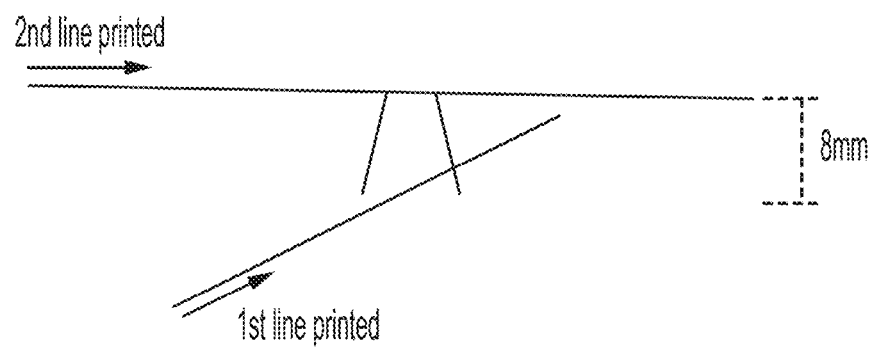
Figure 17C:
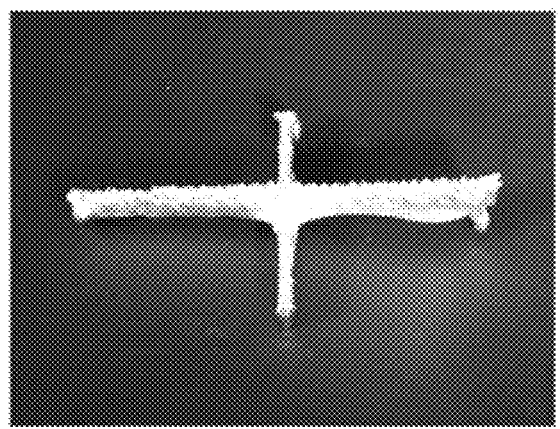
Figure 17D:
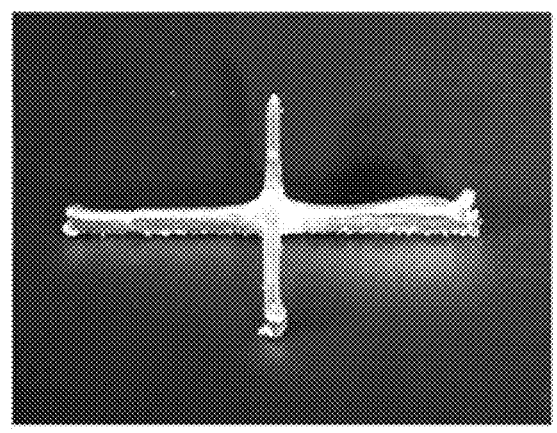

FIGS. 17A-D illustrate joining on different planes. In this process, a first line is printed. A second line is printed, in which two downward spikes are formed on opposing sides of the first line. The process joins the first and second lines together, as shown in the photographs of FIGS. 17C-D. The process of FIGS. 17A-D has spikes create an angled groove to cradle the first line.

3.3.5.4: Joining on Different Planes—C

It can be observed in this joint that the first 90-degree extrusion downwards is perhaps not necessary as the joint is happening in the second extrusion. This leads to further explorations which will be analyzed on the following, reducing the amount of liquid metal printing, reducing both costs and time.

FIGS. 18A-D illustrate joining on different planes. In this process, a first line is printed. A second line is printed, in which two downward spikes are formed on opposing sides of the first line. The process joins the first and second lines together, as shown in the photographs of FIGS. 18C-D. In the embodiment FIGS. 18A-D, one downward spike is narrower than the other. Consequently, this figure demonstrates that spikes of differing geometry can be created.

3.3.5.5: Testing Joining Directly into the First Printed Line

Figure 19A:
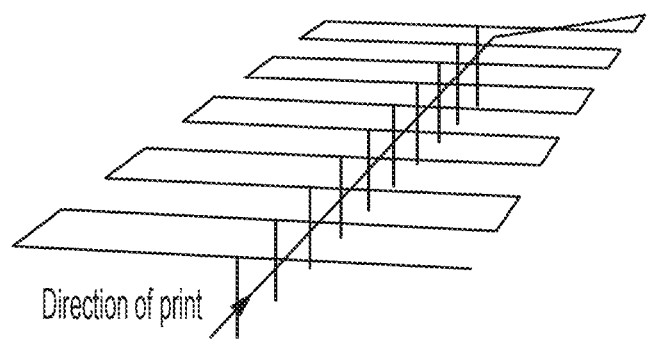
FIGS. 19A-C illustrate joints.
Figure 19B:
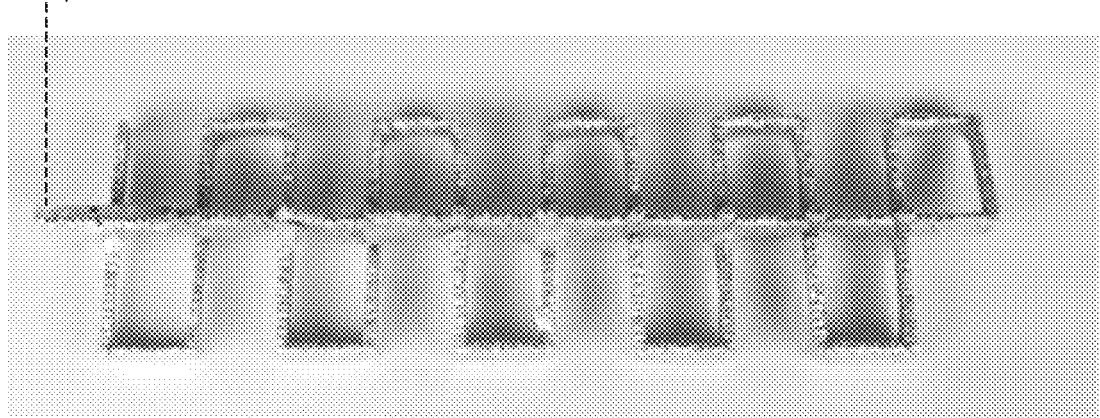
Figure 19C:
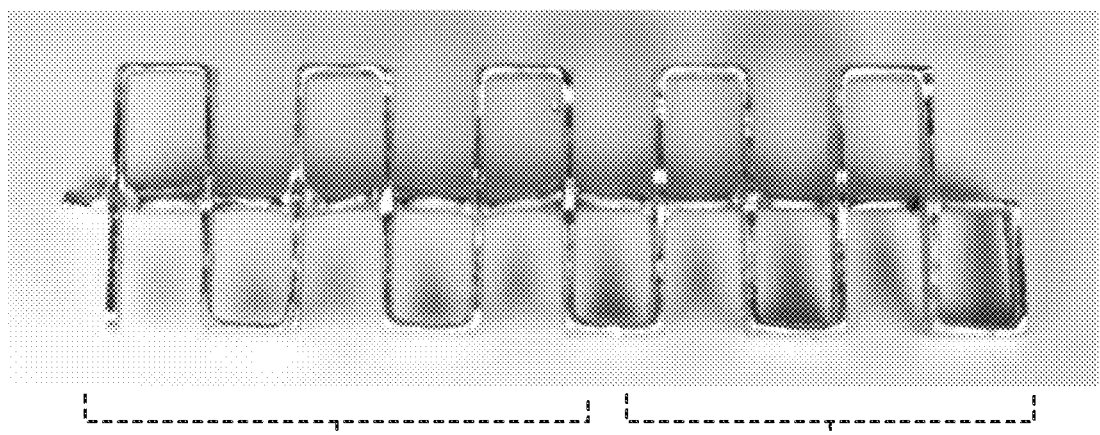

FIGS. 19A-C illustrate joining on different planes. In an attempt to reduce the amount of liquid metal printed and inspired by the previous print (Joining on different planes, C) this test explores how joints could work by protruding the first path printed. This only works when the first path is still liquid since the nozzle can push through the still-liquid metal. A time difference of 20 seconds or longer results in a fracture in the first path, making it not a suitable joining method for joints with over 20 second difference.

3.3.5.6: Testing Joints without Protruding

Figure 20A:
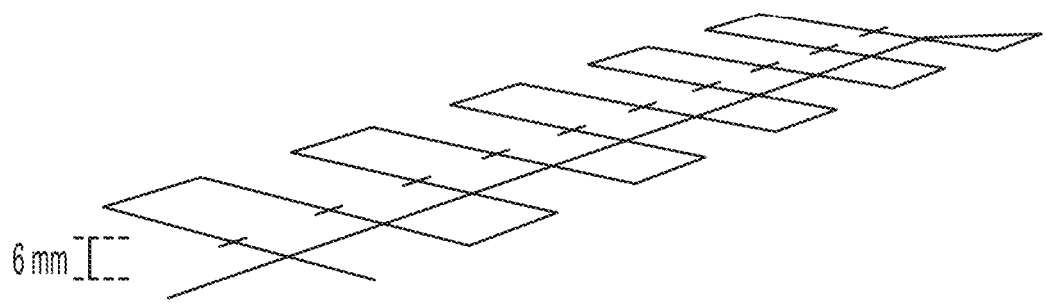
FIGS. 20A-B illustrate tests of joints without protruding.
Figure 20B:
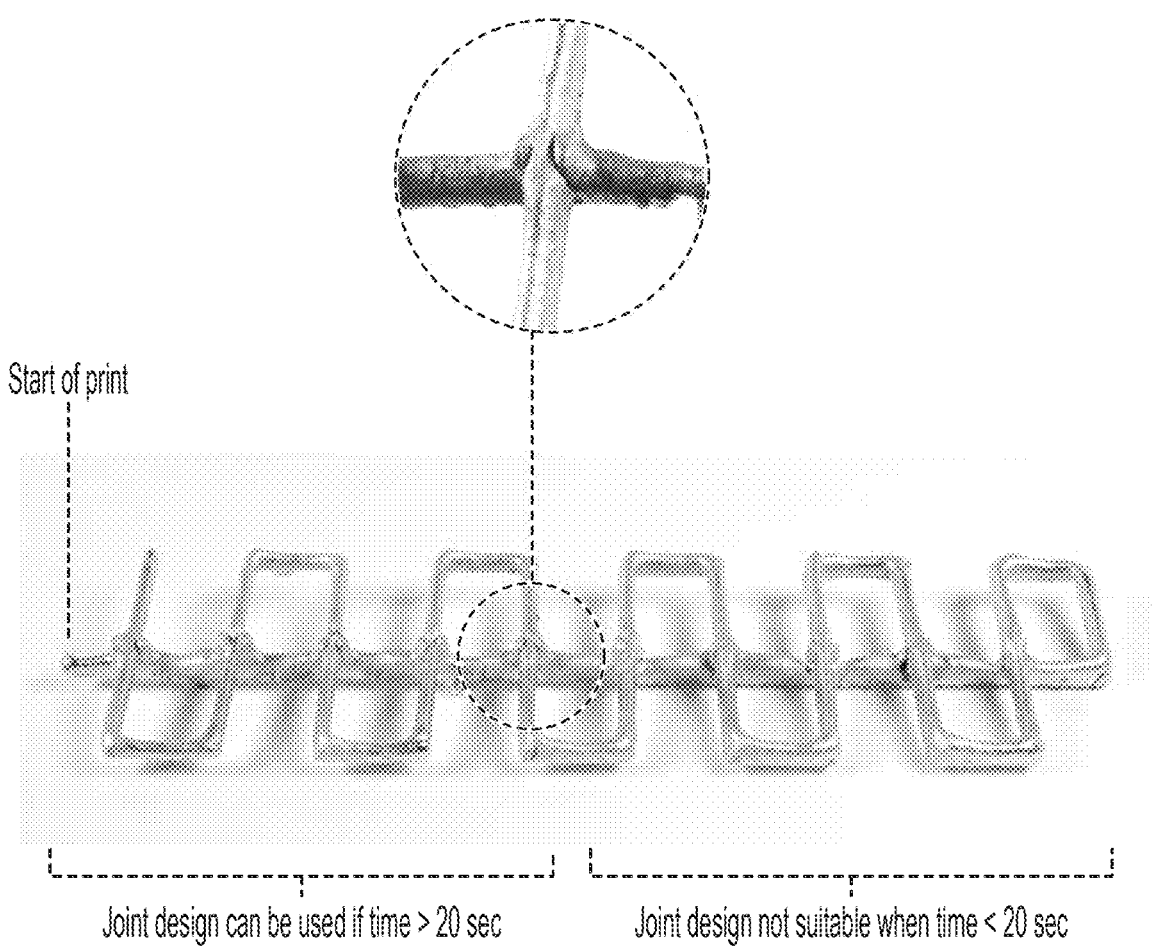

FIGS. 20A-B illustrate tests of joints without protruding. This method explore how joints can be made without the need of protruding the first path printed, and is another test of time-dependency in printing joints. This only works when the first path is solidified. A time difference of 20 seconds or longer results in a deformation in the first path, making it not a suitable joining method for joints with less than 20 second difference. This method could therefore be combined with the previous method, for the joints that do not work with this method work with the previous one, and vice versa.

Figure 21A:
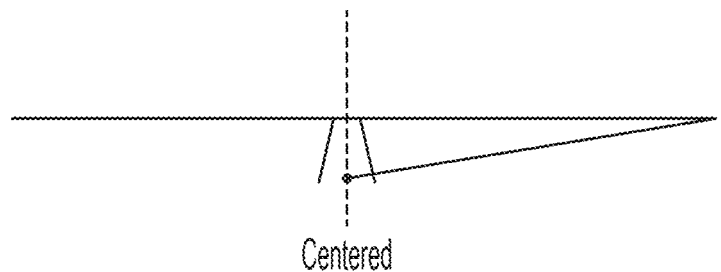
FIGS. 21A-C illustrate tests exploring time difference in formation of joints.
Figure 21B:
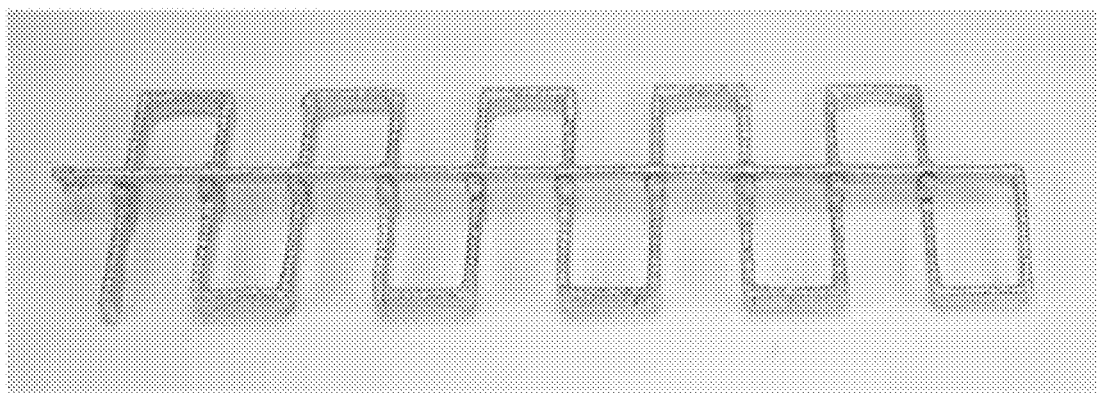
Figure 21C:
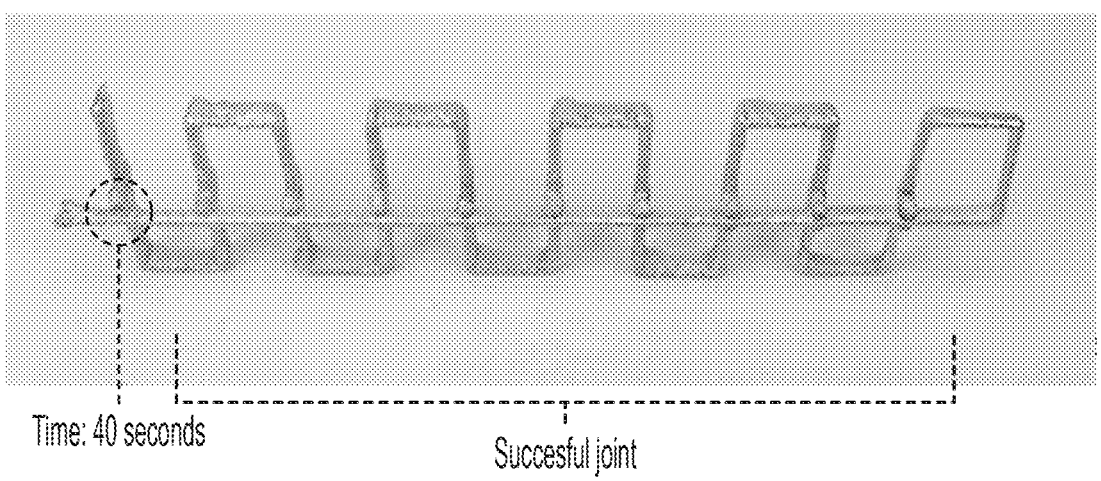

3.3.5.7: Exploring Time Difference and Positioning on Joining on Different Planes, B— Centered FIGS. 21A-C illustrate tests exploring time difference as well as positioning of a second path in joint B print (Joining on different planes, B). When centered, this joint can be used if the time difference between the both paths is less than 40 seconds.

3.3.5.8: Exploring Time Difference and Positioning on Joining on Different Planes, B— Off Centre Printing off-centre is not recommended as it causes significant deformations and the quality of the joint is compromised.

3.3.5.9: Parallel Joining

Figure 22A:
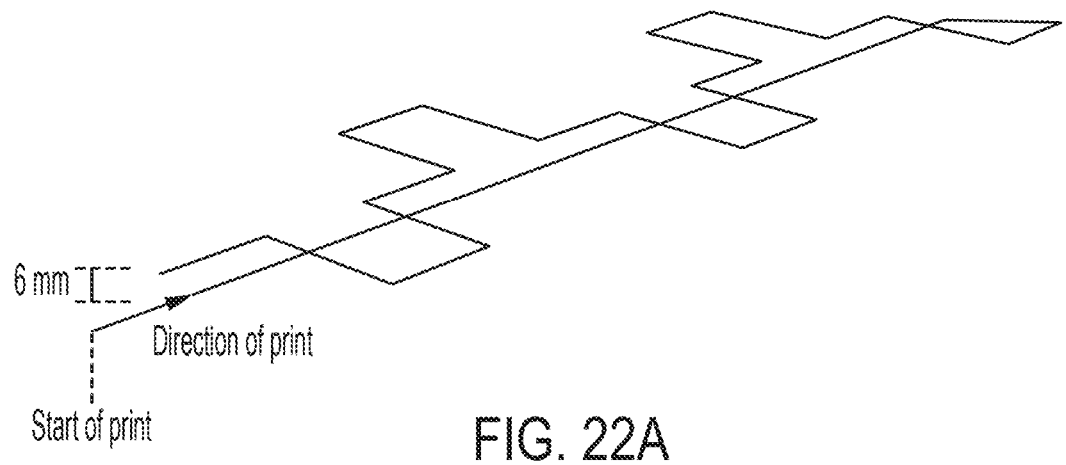
FIGS. 22A-C illustrate tests of joints.
Figure 22B:
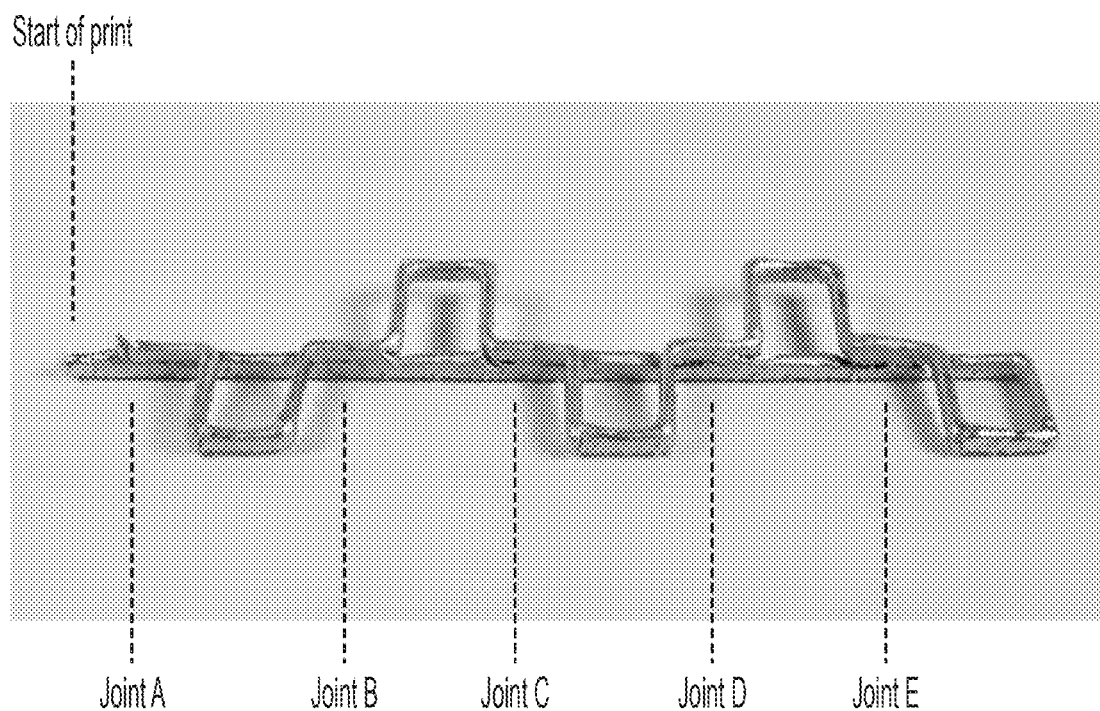
Figure 22C:
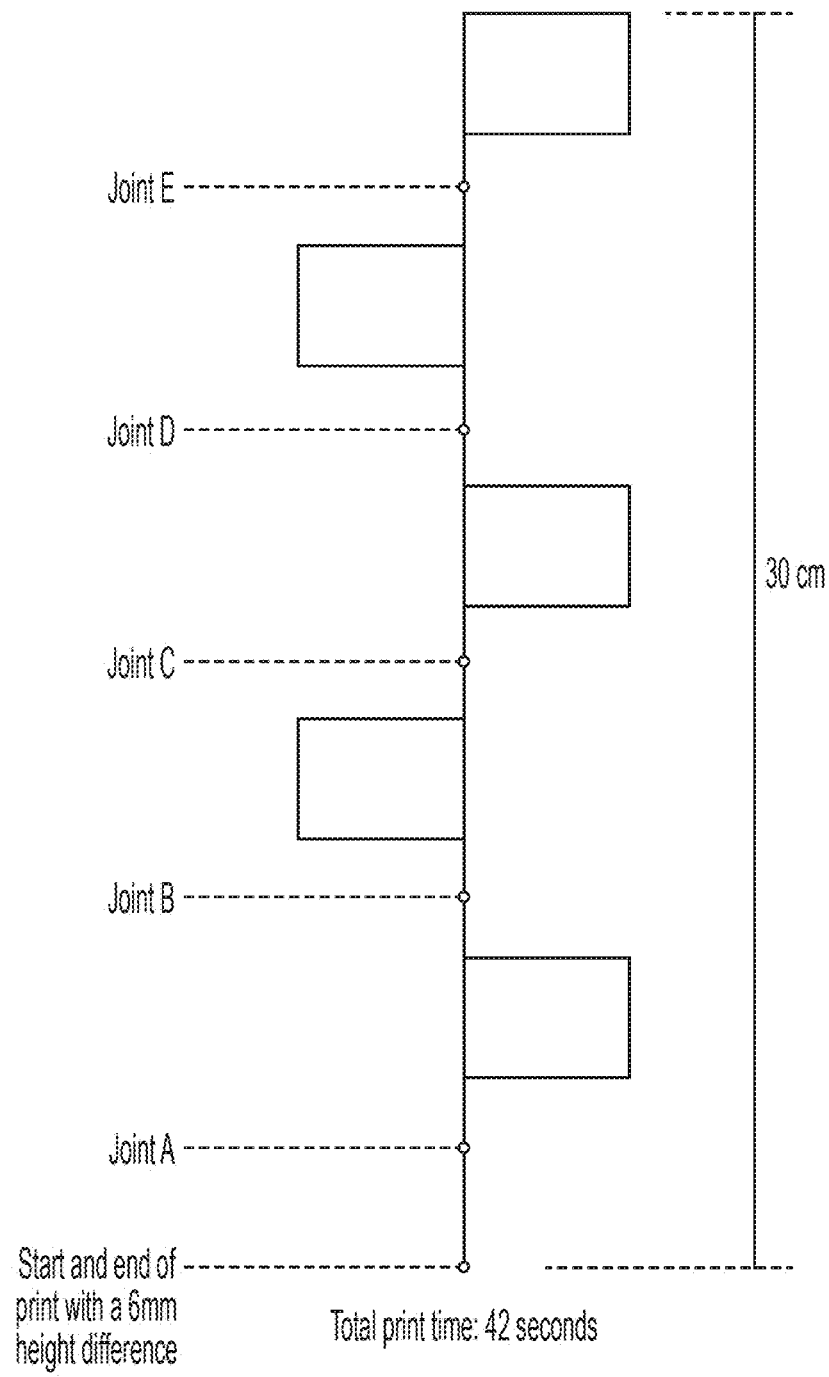
Figure 23A:
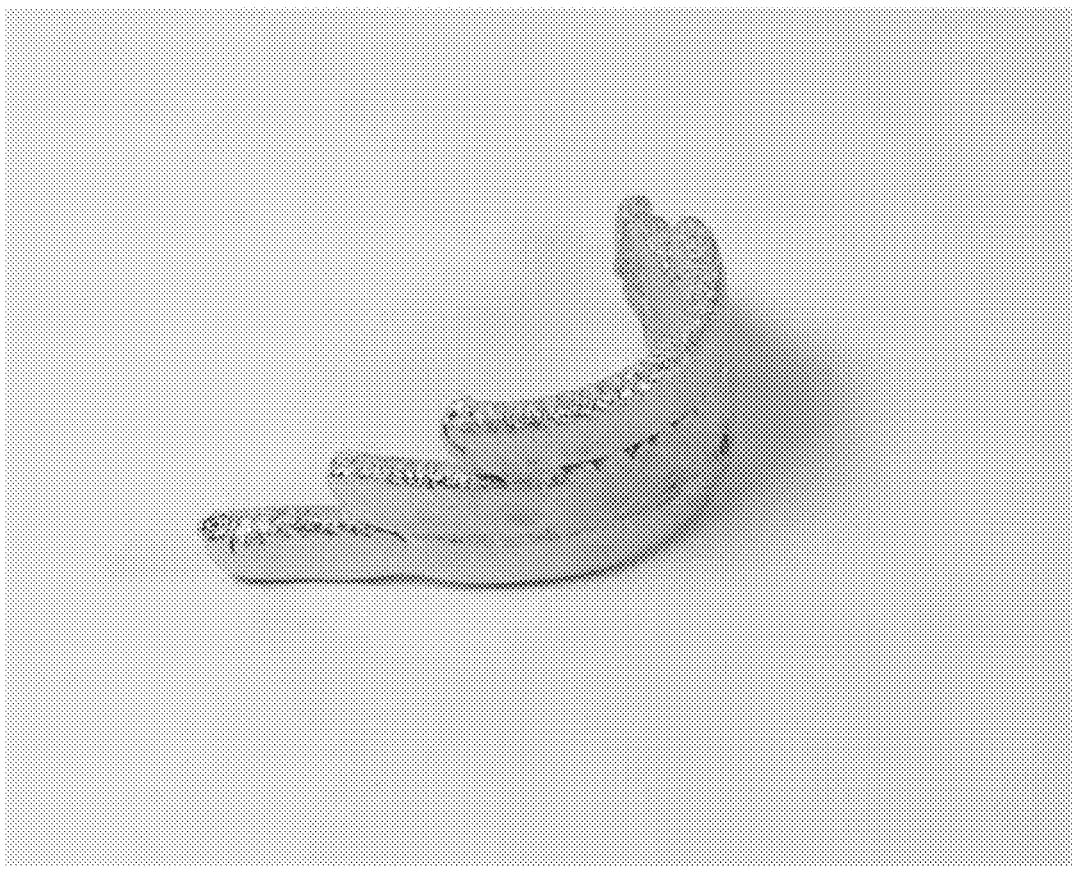
FIGS. 23A-B are photographs of objects printed according to methods described herein, whereby the objects are joined along curved surfaces.
Figure 23B:
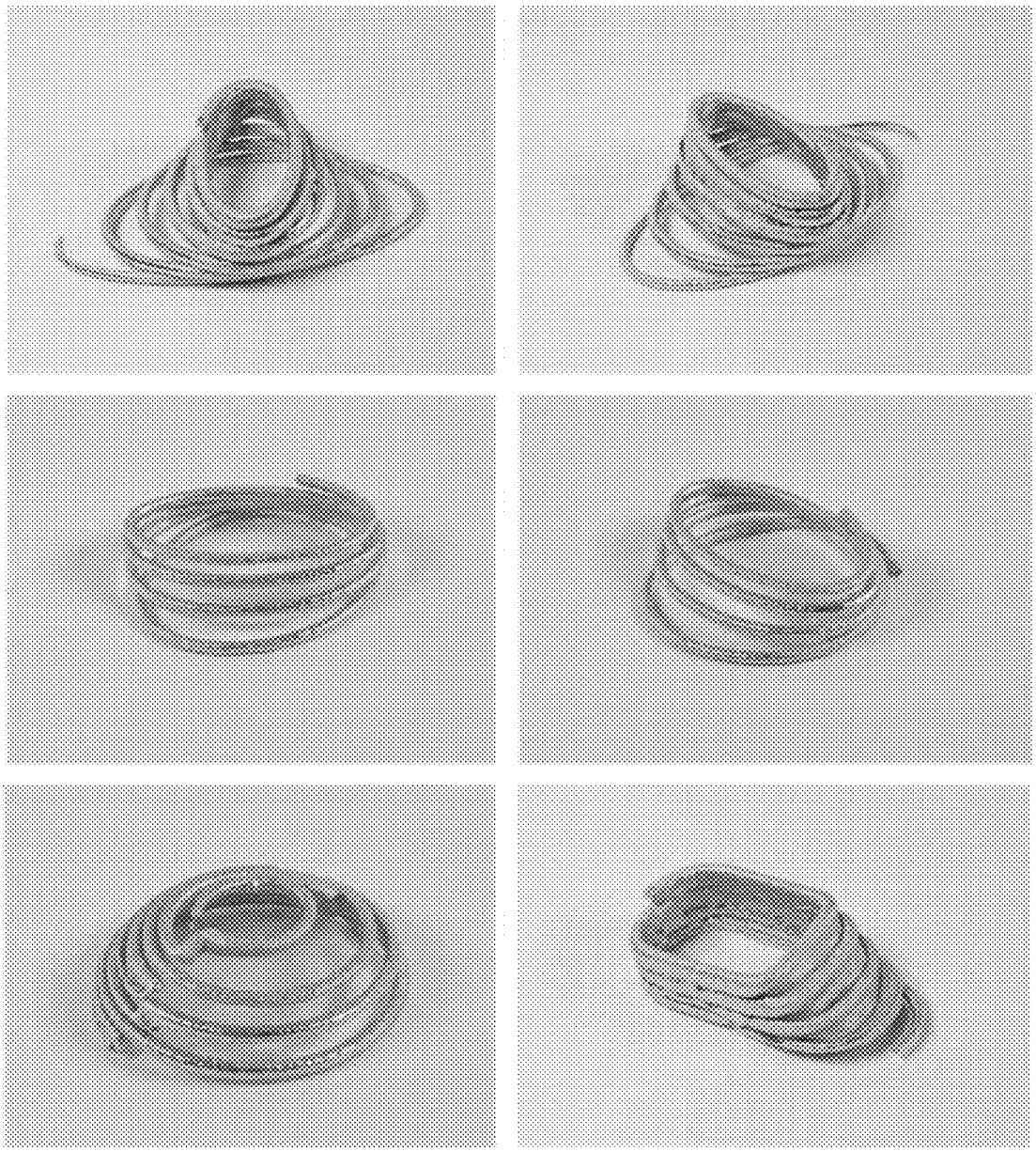
Figure 25A:
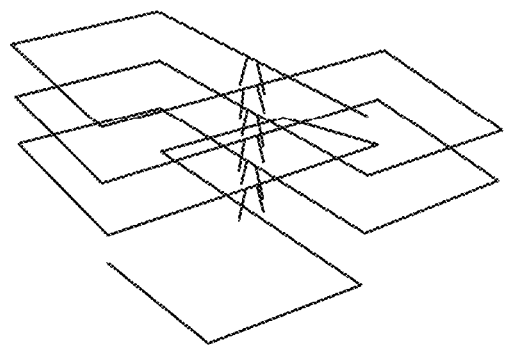
FIGS. 25A-D illustrate joining at multiple levels—joints in the same direction every second layer.
Figure 25B:
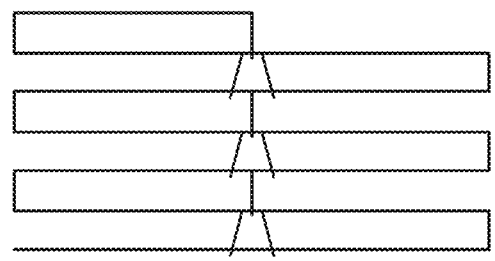
Figure 25C:
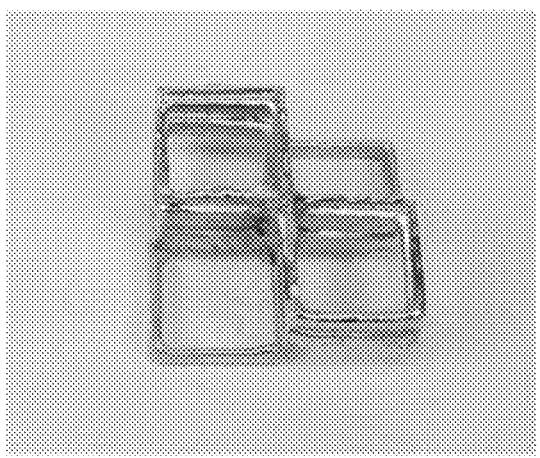
Figure 25D:
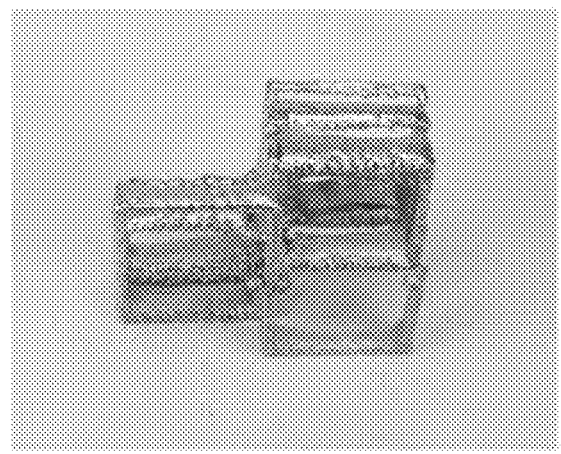
Figure 29A:
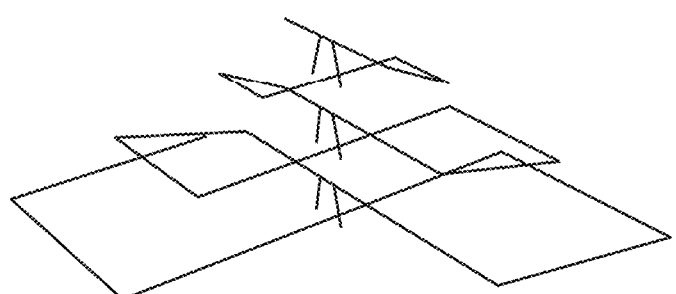
FIGS. 29A-E illustrate joining at multiple levels—joints in the same direction every second layer.
Figure 29B:
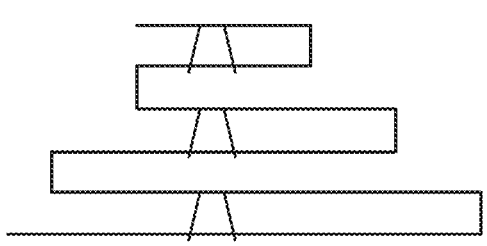
Figure 29C:
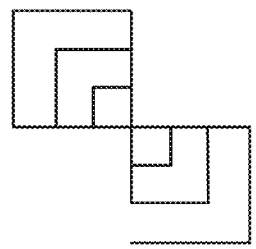
Figure 29D:
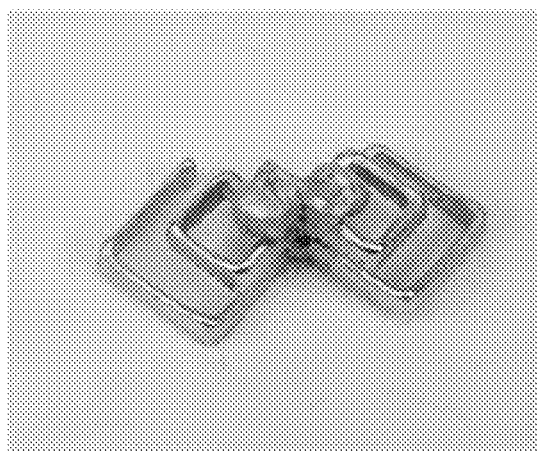
Figure 29E:
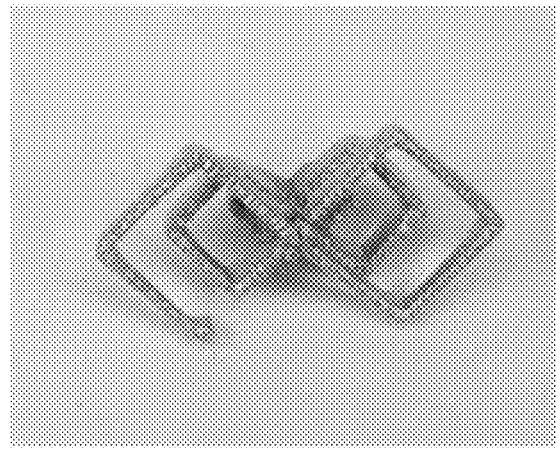
Figure 30A:
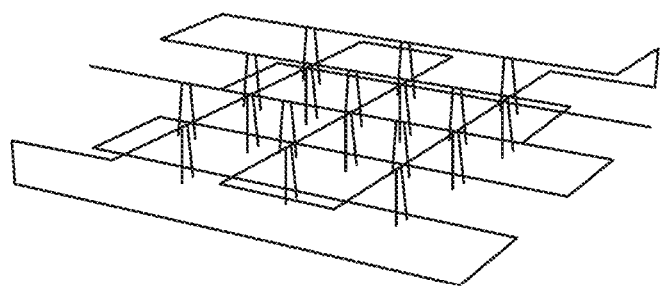
FIGS. 30A-C illustrate a grid design with double joints in different direction every level.
Figure 30B:
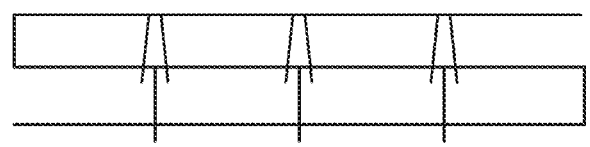
Figure 30C:
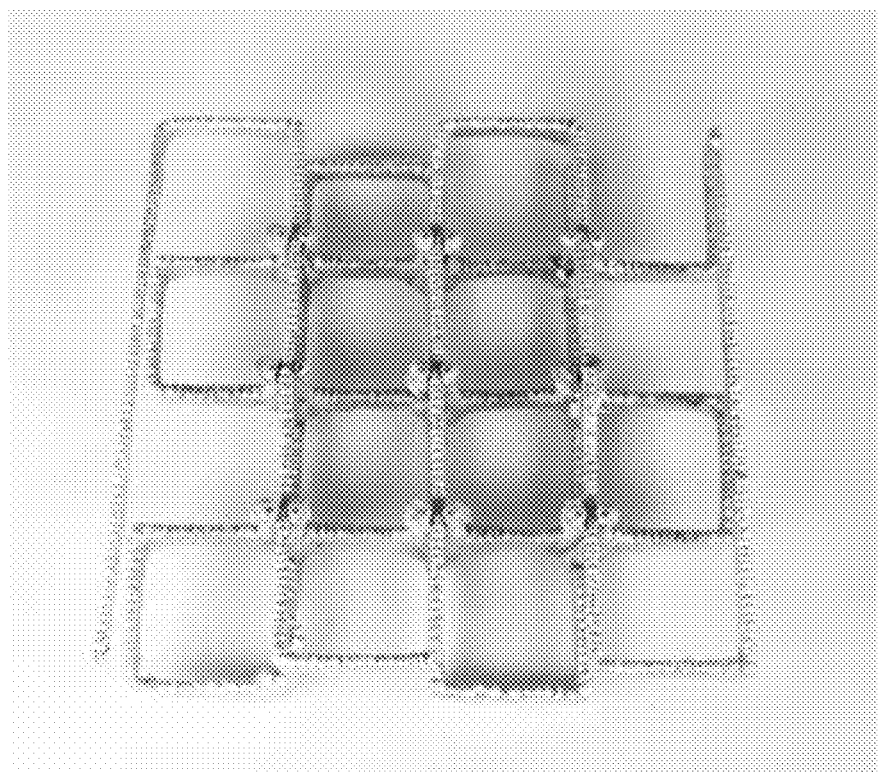

FIGS. 22A-C illustrate parallel joining. Joining parallelly allows to reduce distortions in the print and create stronger bonds. The following test explores the effect of time on the quality of parallel joining. Taking a closer look at the image bellow, one can observe how joints A and B are the ones with the least distortion and with most surface area joint. These two joints are the ones with the largest time interval between both paths, an interval of more than 35 seconds.

However, there was only a 5 second interval between paths in joint E, creating significant distortions on the print as the material is still liquid. As seen in the simulation, this allows for powder to get in between the joints, reducing the surface area joined. We can see how on joints D and C this distortion gets reduced as time increases, for the print is solidifying.

3.3.5.9: Parallel Joining and Distance

The following distances are to be used in regard to the speed of the print.

Speed: 25 mm/s; Spacing between layers: 14 mm
Speed: 50 mm/s; Spacing between layers: 6 mm
Speed: 75 mm/s; Spacing between layers: 3.5 mm Joining at different distances to the ones previously mentioned result in paths not being joined, such as the above prints (except bottom right image). Varying the distances between layers allows for different levels of porosity to be achieved. The larger the distance the greater the porosity.

3.3.6. Grid Designs

Generating Grid Systems

Types: Same direction; Varying direction; Same height; Varying distances

Printing in liquid metal a framework of paths allows for exploring networks that are either parallel to each other or cross each other at specific angles. Joining methods explored in the previous section inform the following grid designs.

FIGS. 24A-D, 25A-D, 26A-D, 27A-D, 28A-D, 29A-E, and 30A-C illustrate grid systems. Each of these figures is an illustration of a plurality of joints similar to FIGS. 17A-D. These figures demonstrate that the joints can be oriented differently (e.g., need not be precisely horizontal or vertical). With the techniques described herein, a wide variety of orientations are possible.

4. Usage 4.1 Printing in Three-Dimensional Space

This technology allows for objects at small or large scales to be printed reminiscent of 2-D drawing or sketching yet in three-dimensional space. When connected with design software, a modeling tool or VR headset, this printing technology could allow for a designer to sketch and design in mid-air while simultaneously printing at the same speed and same scale, within the powder. This 1:1 design to production speed and length-scale has not been realized before due to time constraints inherent with physical fabrication. Most fabrication processes, even for quick sketch models, take significant amounts of time and therefore cannot be as fast as sketching. With this technology a printed part can be created at the same speed that a robot or a human moves their arm through the air.

4.2 Cooling Time

The high-temperature printed liquid can be designed to cool extremely quickly or slowly, depending on the application and the temperature of the powder bath. A faster cooling time could reduce the overall fabrication time while a slower cooling time could allow for more thorough bonding when printing intersecting paths. A slower cooling time could also enable bonding of the liquid printed structure with physical objects that have been placed into the powder.

4.3 Post-Process

Different forms of post-curing could be incorporated such as post sintering or shape-memory setting to change the properties of the material. After removing the part from the powder bath, it can be easily washed-off with water to remove excess powder, or coated with some material to strengthen it, color the part, further cure the part or any number of post-processing capabilities that could enhance the properties. For example, if a certain metal is printed within the powder bath, then removed and washed, it could be sent through a post-processing heat treatment to strengthen the structure, or to coat it, or treat the surface to create a certain finish. Such a capability could greatly increase part strength, such as through a post-printing firing or sintering processes or a number of other interesting material capabilities.

4.5 Material Usage & Recycling

Due to the elimination of printed support material and the truly three-dimensional nature of this printing process, much less material can be used for a printed part. This process does not require baths or beds full of powder or liquid resins. Similarly, the layer-based process and built-up printed support materials are quite wasteful in the total amount of material used compared with the material needed for the final part. In this process, no material is wasted.

After a part is printed, if it is decided that it does not function or meet the requirements. The part can be fully recycled by melting it back down to a liquid, A piece of printed metal, for example, can be broken into small pieces, placed back into the heated reservoir then extruded to make another part. This fully recyclable and reversible capability is unique for most printing processes.

5. Advantages & Improvements over Existing Methods

This technology offers significant improvement over existing methods of three-dimensional printing, including; SLA, SLA, FDM, Polyjet and powder/binder printing processes. To date, three-dimensional printing has not made a significant impact in industrial manufacturing processes because of 1. long printing times compared with injection molding or other standard manufacturing processes, 2. relatively small build volume limiting realistic applications, and 3. the availability of only low-quality printable plastics and other materials, the properties of which do not compare with industrial materials. Our technology dramatically improves upon each of these areas.

Since our method does not require support material to build overhangs or complex three-dimensional structures, it can be significantly faster. FDM, Polyjet and SLA technologies require support that significantly increase the time required to print and the time after printing due to the need to remove the supports either manually or through dissolution. Without supports, our technology is still able to print the same complex three-dimensional shapes at the same time as reducing the need for additional unnecessary material, unnecessary time for printing and unnecessary post-printing processes. Once the structures are printed and the material cools, they can be removed from the powder, simply washed off with water and then they are finished. The process utilizes the powder's material structure to suspend the print in three-dimensional space and allows for non-layer-based printing where the nozzle can move freely in all three axes at any time.

This technology also drastically increases the speed of printing by eliminating the requirement to print in successive layers. Nearly every printing process available today requires individual layers to be printed, layer-after-layer. This drastically increases the time required to print a tall or complex three-dimensional form and requires sophisticated digital "slicing" techniques, producing large file sizes. For example, if a wireframe structure was to be printed using FDM, SLA, SLS, powder-based binder printing or polyjet, it would need to be sliced with many layers and then printed in linear paths at each layer. The edges of the wireframe structure would also need to have support material printed underneath due to their cantilever and unsupported shape. In our technology these lines could simply be printed in three-dimensional space eliminating the support material and eliminating the slices. Another aspect that increases the speed of printing compared to other free-form or in-air three-dimensional printing processes is the speed of extrusion. All other processes require that the material be cured or hardened before the machine moves to the next layer or continues to move the nozzle. This drastically decreases the speed at which the printer can move. In this process, because the material is suspended in the powder in three-dimensional space, we can continue to move quickly and extrude liquid materials while they are suspended behind the nozzle path and cooled to solidify. Because of these factors, the speed of printing can likely be increased by many orders of magnitude compared to traditional printing processes.

As compared with traditional methods of three-dimensional printing, this process is also scalable from very small-scale to large-scale. Since the process is dramatically faster we can build much larger structures in less time. Our technology can also scale-up by using larger tanks of powder and larger CNC machines and allow very large structures to be produced extremely quickly. The speed and scale of the print may now be able to be compared with other industrial processes like injection molding or machining. Especially if the assembly time of a traditional product is taken into consideration, our method, which may not require any assembly since the entire product could be printed simultaneously, could drastically change manufacturing scenarios.

One of the most significant advances over traditional three-dimensional printing processes is the improvement in material properties. Because we are printing with a liquid deposition system and using high-temperature metals and thermoplastics, we are able to print with high-quality industrially-standard materials that are not possible with other forms of printing. Our process uses the same materials that are available today in industrial manufacturing, such as metals and thermoplastics.

6. Applications

Apparel & Sports Equipment: Printing 1:1 sports equipment (bikes, boards, helmets, poles etc); Potentially as fast, or faster, than existing manufacturing processes, highly customized, industrial-quality materials, metals and thermoplastics; Printing connectors, spikes, midsoles and other footwear parts.

Fabrication & Manufacturing: Large-scale tooling, prototyping, fixturing; Potentially as fast, or faster, than existing manufacturing processes, highly customized, industrial-quality materials (metals and thermoplastics) large-scale or small-scale parts; Hybrid approaches with multiple fabrication processes (metals with thermoplastics or multiple metals, multiple plastics etc.).

Aviation and Automotive Applications: Metal or plastic parts for interior components, exterior components, engine components, connectors; Tooling, prototyping, fixturing; Potentially as fast, or faster, than existing manufacturing processes, highly customized, industrial-quality materials, large-scale or small-scale parts Furniture & Interior Products: Printed parts for interior applications, furniture, connectors, brackets, wheels, handles, structures etc.; Tooling, prototyping, fixturing; Potentially as fast, or faster, than existing manufacturing processes, highly customized, industrial-quality materials, large-scale or small-scale parts.

Architecture, Engineering & Construction: Construction connectors, architectural details, structural components, interior finishes; Final structures (walls, surfaces, skin/panels, 1:1 details); On-site fabrication process during construction due to speed/scale; New design process with physical three-dimensional 1:1 size/speed sketching.

Toys and other Consumer goods: Printing 1:1 consumer goods/toys; Printing Robot components; Printing Tools & equipment.

INCORPORATION BY REFERENCE; EQUIVALENTS

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method of forming a metal object, the method comprising:
   a) depositing a liquid metal into a reservoir of powder by using an apparatus for extruding liquid metal, the apparatus comprising:
      i) a crucible having an upper chamber with a well for holding liquid metal;
      ii) a first heating element that at least partially surrounds the crucible;
      iii) an interior chamber below the crucible that connects the crucible to a nozzle;
      iv) an exterior chamber, having positioned therein a second heating element that at least partially surrounds the interior chamber; and
      v) a rod disposed between the nozzle and a solenoid resting above the crucible; and
   b) allowing the metal to solidify.

2. The method of claim 1, further comprising moving the nozzle in three dimensions.

3. The method of claim 1, wherein a gantry or robotic arm moves the nozzle.

4. The method of claim 1, wherein the powder is powdered salt.

5. The method of claim 1, wherein the liquid metal is deposited at least 55 mm below a surface of the powder.

6. The method of claim 1, further comprising forming a joint by moving the nozzle through previously-deposited liquid metal.

7. The method of claim 1, further comprising forming a joint by depositing liquid metal adjacent to previously deposited, but solidified metal.

8. An apparatus for extruding liquid metal, the apparatus comprising:
   a) a crucible having an upper chamber with a well for holding liquid metal;

b) a first heating element that at least partially surrounds the crucible;
c) an interior chamber below the crucible that connects the crucible to a nozzle;
d) an exterior chamber, having positioned therein a second heating element that at least partially surrounds the interior chamber; and
e) a rod disposed between the nozzle and a solenoid resting above the crucible.

9. The apparatus of claim 8, further comprising a probe positioned within the crucible and supported above the crucible, whereby the probe is configured to generate a signal indicative of the presence of an electrical current.

10. The apparatus of claim 8, further comprising an inlet into the upper chamber for an inert gas.

11. The apparatus of claim 8, further comprising a clamp that connects the interior chamber to a bracket.

12. The apparatus of claim 8, wherein the nozzle and interior chamber have mating threaded portions.

13. The apparatus of claim 8, further comprising a motor that controls inlet of feedstock wire into the crucible.

14. The method of claim 1, wherein the liquid metal is aluminum.

* * * * *